(12) United States Patent  
Zini et al.

(10) Patent No.: US 8,204,624 B2
(45) Date of Patent: *Jun. 19, 2012

(54) ROBOTIC ORDERING AND DELIVERY APPARATUSES, SYSTEMS AND METHODS

(75) Inventors: Aldo Zini, Venetia, PA (US); Spencer Wayne Allen, Wexford, PA (US); Barry Mark Skirble, Allison Park, PA (US); Henry F Thorne, Pittsburgh, PA (US); Stuart Fairley, Pittsburgh, PA (US)

(73) Assignee: Aethon, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/027,861

(22) Filed: Feb. 15, 2011

(65) Prior Publication Data

US 2011/0137457 A1    Jun. 9, 2011

Related U.S. Application Data

(60) Continuation of application No. 12/785,608, filed on May 24, 2001, now Pat. No. 7,894,939, which is a division of application No. 11/549,815, filed on Oct. 16, 2006, now Pat. No. 7,996,109.

(60) Provisional application No. 60/727,280, filed on Oct. 14, 2005.

(51) Int. Cl.
    *G06F 19/00* (2011.01)
(52) U.S. Cl. .................................................. 700/245
(58) Field of Classification Search .................. 700/245, 700/247, 258; 180/21, 168, 169; 318/568.11, 318/568.12, 568.16, 587, 628
See application file for complete search history.

(56) References Cited

U.S. PATENT DOCUMENTS

| | | |
|---|---|---|
| 4,483,407 A | 11/1984 | Iwamoto et al. |
| 4,674,048 A | 6/1987 | Okumura |
| 4,746,977 A | 5/1988 | White |
| 4,750,123 A | 6/1988 | Christian |
| 4,800,977 A | 1/1989 | Boegli et al. |
| 4,816,998 A | 3/1989 | Ahlbom |
| 4,847,769 A | 7/1989 | Reeve |
| 4,875,172 A | 10/1989 | Kanayama |
| 4,944,357 A | 7/1990 | Wible et al. |
| 5,170,352 A | 12/1992 | McTamaney et al. |
| 5,175,480 A | 12/1992 | McKeefery et al. |
| 5,276,618 A | 1/1994 | Everett, Jr. |
| 5,315,517 A | 5/1994 | Kawase et al. |

(Continued)

OTHER PUBLICATIONS

"Helpmate Trackless Robotic Courier", Pyxis Corporation, Product Brochure.

*Primary Examiner* — Kim T Nguyen
(74) *Attorney, Agent, or Firm* — Reed Smith LLP

(57) ABSTRACT

Systems, methods and devices for the automated retrieval/delivery of goods from one location to another using a robotic device such as a tug and accompanying cart. A computer within the tug/cart stores a map of the building floor plan and intended paths for the tug to take when traversing from one location to the next. During the delivery, a variety of different sensors and scanners gather data that is used to avoid obstacles and/or continuously adjust the movement of the tug in order to more closely follow the intended path. The system preferably includes wireless networks that allow one or more tugs to communicate with a tug base station, a primary network located at the site of the delivery and a remote host center that monitors the status and data collected by the tugs.

25 Claims, 12 Drawing Sheets

U.S. PATENT DOCUMENTS

| | | | |
|---|---|---|---|
| 5,324,948 A | 6/1994 | Dudar et al. |
| 5,350,033 A | 9/1994 | Kraft |
| 5,367,458 A | 11/1994 | Roberts et al. |
| 5,402,344 A | 3/1995 | Reister et al. |
| 5,446,356 A | 8/1995 | Kim |
| 5,461,292 A | 10/1995 | Zondlo |
| 5,487,009 A | 1/1996 | Hill |
| 5,488,277 A | 1/1996 | Nishikawa et al. |
| 5,515,934 A | 5/1996 | Davis |
| 5,535,843 A | 7/1996 | Takeda et al. |
| 5,545,960 A | 8/1996 | Ishikawa |
| 5,548,511 A | 8/1996 | Bancroft |
| 5,548,512 A | 8/1996 | Quraishi |
| 5,559,696 A | 9/1996 | Borenstein |
| 5,652,489 A | 7/1997 | Kawakami |
| 5,680,306 A | 10/1997 | Shin et al. |
| 5,684,696 A | 11/1997 | Rao et al. |
| 5,687,294 A | 11/1997 | Jeong |
| 5,709,007 A | 1/1998 | Chiang |
| 5,739,657 A | 4/1998 | Takayama et al. |
| 5,764,014 A | 6/1998 | Jakeway et al. |
| 5,819,008 A | 10/1998 | Asama et al. |
| 5,819,863 A | 10/1998 | Zollinger et al. |
| 5,867,800 A | 2/1999 | Leif |
| 5,908,466 A | 6/1999 | Veugen et al. |
| 5,916,285 A | 6/1999 | Alofs et al. |
| 5,942,869 A | 8/1999 | Katou et al. |
| 6,038,501 A | 3/2000 | Kawakami |
| 6,041,274 A | 3/2000 | Onishi et al. |
| 6,046,565 A | 4/2000 | Thorne |
| 6,246,930 B1 | 6/2001 | Hori |
| 6,272,405 B1 | 8/2001 | Kubota |
| 6,308,118 B1 | 10/2001 | Holmquist |
| 6,314,341 B1 | 11/2001 | Kanayama |
| 6,338,013 B1 | 1/2002 | Ruffner |
| 6,360,165 B1 | 3/2002 | Chowdhary |
| 6,370,453 B2 | 4/2002 | Sommer |
| 6,385,515 B1 | 5/2002 | Dickson et al. |
| 6,442,476 B1 | 8/2002 | Poropat |
| 6,445,983 B1 | 9/2002 | Dickson et al. |
| 6,446,005 B1 | 9/2002 | Bingeman et al. |
| 6,453,223 B1 | 9/2002 | Kelly et al. |
| 6,454,036 B1 | 9/2002 | Airey et al. |
| 6,459,955 B1 | 10/2002 | Bartsch et al. |
| 6,459,966 B2 | 10/2002 | Nakano et al. |
| 6,502,017 B2 | 12/2002 | Ruffner |
| 6,629,735 B1 | 10/2003 | Galy |
| 6,946,565 B2 | 9/2005 | Fedouloff et al. |
| 7,100,725 B2 | 9/2006 | Thorne |
| 7,894,939 B2 * | 2/2011 | Zini et al. ............... 700/245 |
| 2003/0030398 A1 | 2/2003 | Jacobs et al. |
| 2004/0002283 A1 | 1/2004 | Herbert et al. |
| 2004/0073337 A1 | 4/2004 | McKee et al. |
| 2004/0093650 A1 | 5/2004 | Martins et al. |
| 2004/0195012 A1 | 10/2004 | Song et al. |
| 2005/0029029 A1 | 2/2005 | Thorne |
| 2005/0131645 A1 | 6/2005 | Panopoulos |
| 2006/0058921 A1 * | 3/2006 | Okamoto ............... 700/255 |

* cited by examiner

ROBOTIC ORDERING AND DELIVERY APPARATUSES, SYSTEMS AND METHODS

CROSS-REFERENCE TO RELATED APPLICATION

This application is a continuation of, and claims the benefit under 35 U.S.C. §120 of the earlier filing date of, U.S. patent application Ser. No. 12/785,608, filed on May 24, 2010, which is a divisional application of, and claims the benefit under 35 U.S.C. §120 of the earlier filing date of, U.S. patent application Ser. No. 11/549,815, filed on Oct. 16, 2006, which claims the benefit under 35 U.S.C. §119(e) of the earlier filing date of U.S. Provisional Application Ser. No. 60/727,280 filed on Oct. 14, 2005.

BACKGROUND OF THE INVENTION

1. Field of the Invention

The present invention relates generally to robotic retrieval/delivery devices and methods of using the same, and, more particularly, the present invention is directed to asset ordering, tracking and delivery methods utilizing an autonomous robotic tug and cart.

2. Description of the Background

Robotic and automated vehicles for delivering or transporting materials indoors have been developed and utilized in a number of very specialized applications. For example, several attempts have been made to design and use a mail delivery robot that makes regular stops to make deliveries on a somewhat regular basis. Likewise, one or more attempts at using an unmanned robot to push or pull a cart around a predefined circuit have also been contemplated. However, rather than being an independent (i.e., autonomous) vehicle, these robots are typically automated guided vehicles that follow a predefined track such as an ultraviolet track painted on the ground, a hidden guide wire or some other means of providing a predefined path for the vehicle.

In many different pursuits, delivery tasks are repeated on a daily if not hourly basis. Even in the relatively defined space of enclosed buildings, there are an almost limitless number of applications where people are used to perform repeated delivery tasks that require little or no critical thinking on a day-to-day basis. For example, in a hospital setting, hospital employees spend an exceedingly large amount of time pushing carts around the hospital and delivering small goods to various locations throughout the hospital. No matter which employee undertakes these errands, high cost human resources are being wasted on tasks that could be automated. Heretofore, however, no cost-effective solution to this delivery problem has been available.

Certain previous robots have been designed to address the problem of navigation and tracking the position of a robot as it travels in an indoor environment. For example, U.S. Pat. No. 7,100,725, which is assigned to the owners of the present invention and is incorporated herein by reference in its entirety, describes certain features of a robotic cart pulling vehicle that address the navigation and location problem. However, there are many other aspects of utilizing such a robotic device that are not addressed therein.

Another example of prior art systems include a class of mobile robotic devices that navigate based on predefined linear movement commands. For example, to move from one location to another, the device may attempt to execute commands to: (a) move 10 feet forward; (b) turn left; and (c) move 8 feet forward. While these navigation methodologies are useful, they introduce a high degree of positional error. As additional movement commands are carried out, additional error enters the process. As such, an autonomous delivery system in which sensors are used to constantly confirm/update positional accuracy is sought in this art.

In addition to simply navigating the terrain, a preferred robotic retrieval/delivery system would include a variety of different features and characteristics, none of which have been included in combination in previous robotic tug/cart systems. For example, the robotic tug should include a variety of different redundant sensors that allow it to detect potential obstacles before impact and to confirm positional accuracy to a high degree. The tug should also include certain visual and audible cues as to its current and next intended actions in order to more seamlessly coexist in an environment dominated by humans.

In varied environments, the robotic tug system should provide solutions to work around and through certain commonly encountered obstacles. For example, the robotic tug and cart should be able to move from one floor to another in a multi-story building. The device should be able to manipulate automatic doors or otherwise complete delivery tasks when faced with closed doors. These and other "non-ideal" aspects of real world environments have not heretofore been appropriately addressed by existing robotic applications.

A robotic tug delivery system should also provide a variety of different communication and interface options for all levels of users of the system. For example, as the robotic tug moves, it is desirable to have the tug remain in communication with computers at its present location. Moreover, it would be beneficial to allow for broadband communication to a remote host, for example an entity that oversees the implementation and monitoring of robotic tugs at a variety of different physical locations at the same time.

The present invention, in its preferred embodiments, addresses the above-mentioned limitations of the prior art by providing a cost-effective alternative to employees pushing carts to make deliveries of various goods. Moreover, although many aspects of the present invention will be described with reference to a preferred embodiment in a hospital setting (a particularly good application of the present invention), the invention may be applied to a wide variety of delivery-related tasks in many alternative environments within the scope of the present invention.

SUMMARY OF THE INVENTION

In accordance with at least one preferred embodiment, the present invention provides systems and methods for utilizing a robotic tug and attached cart to retrieve/deliver one or more goods from/to a variety of different locations. Using a touch screen or other web-enabled interface, a predefined schedule and/or simple controls, a user can send the robotic device off to another location with a payload onboard the cart. Through sophisticated path planning, sensing, path adjustment and communication, the device is able to navigate a path to the desired destination and carry out a variety of tasks.

The present tug/cart devices are preferably used within a flexible system. The tug or tugs along with a variety of different carts are put in place at a primary location within which the retrieval/delivery system is to be utilized. Each of the robotic devices is associated with a docking station that provides docking functionality for the one or more robotic tugs including recharging the batteries within the tug, downloading any collected data and or aiding in the performance of a diagnostic self-check of the tug and/or providing a convenient interface (e.g., a touch screen) with which a user can select a desired destination. One of the docking stations may also be the main "home base" station which provides a communicating access point between all of the robotic devices and docking stations and the other system components.

In certain embodiments, the system exists as a series of interconnected wired and/or wireless data networks. For example, the primary location (e.g., where deliveries take place) may have an existing computer network. According to the present invention, a computer is installed with a network card to connect with that existing network as well as to communicate with the one or more tugs actually making the deliveries. Additionally, a remote host or remote service center may monitor and/or provide support for the system by interconnecting with the primary network, e.g., through the Internet.

The tugs for use with the present invention preferably include a variety of different obstruction detection and position-determining sensors. For example, a network of overlapping and forward-looking infrared sensors may be used for long range directional object detection. Moreover, a forward-looking sonar may be used for near field fidelity and additional infrared or other sensors may be used to detect certain other features. Scanning lasers or additional one-dimensional light sensors may also be utilized in various applications. The robotic device uses this sensor information to detect and compute its current position and orientation with respect to its intended path, and signals are sent to its independent motors to adjust the steering along that path to avoid an obstacle or re-orient itself with the intended path.

Since many indoor environments include various types of impediments in normal operation, the present system preferably addresses one or more of these impediments. For example, in order to move from one floor of a building to another, an elevator control panel and algorithm is used to empty and then take over the operation of an elevator. Likewise, an annunciator may be used to audibly/visually alert a user that a robotic device is approaching when the designated delivery point is behind a closed door. Finally, an automated door opening interface or email/text/pager system may be incorporated into the use of the present invention in order to provide additional features and benefits.

As set forth in the detailed description, a wide variety of different tug and cart features/characteristics and system alternatives may be employed to provide optional benefits to the users of the present invention. Moreover, although many of the features are described with respect to the use of the system in a hospital, one skilled in the robotic arts will easily recognize corresponding uses in other industries within the teachings of the present invention. The exemplary uses described herein are not intended to, nor should they, be used to limit the scope of the attached claims in any manner.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

The present invention, in at least one preferred embodiment, provides devices, systems and methods to utilize a robotic tug with mated payload carrying cart (or similar robotic device) in order to perform autonomous retrieval/delivery of goods along a route. The present invention utilizes a mapping algorithm in which the tug attempts to follow a route from the beginning point to the destination. During the delivery trip, a variety of different sensors are utilized to scan for potential obstacles and to constantly determine the position of the robotic device relative to its intended position. This sensor data is then used by a computer onboard the tug and/or the attached cart to alter or modify the preplanned route to avoid obstacles or to adjust the current directional heading to more closely approximate the intended route.

Many different types of robotic tugs, carts and system architectures may be utilized according to the present invention. In the following discussion, the physical features of the robotic tug, the attached cart and the interface between the tug and the cart are initially discussed. Thereafter, a detailed description of certain system components, usage methodologies and other pertinent features and characteristics of the present invention, both required and optional, are presented. Finally, a detailed example of one such robotic tug and attached cart is provided to more clearly illustrate the use of some of these preferred features.

The Tug

Figure 1:
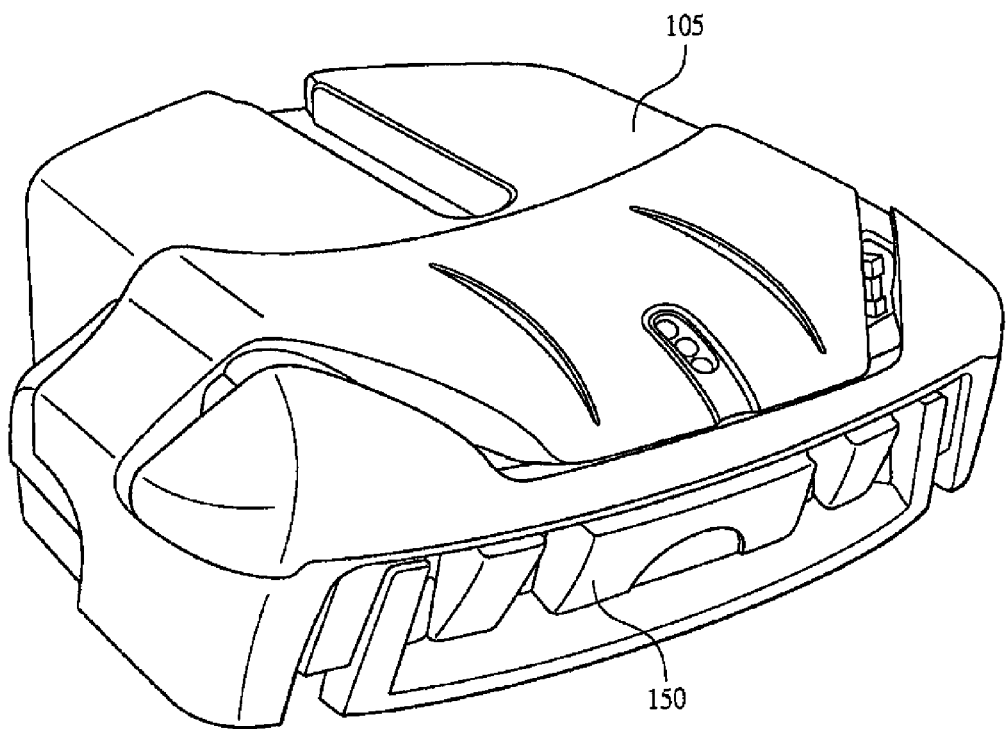
FIG. 1 is an isometric view of an exemplary robotic tug with cover in place.
Figure 2:
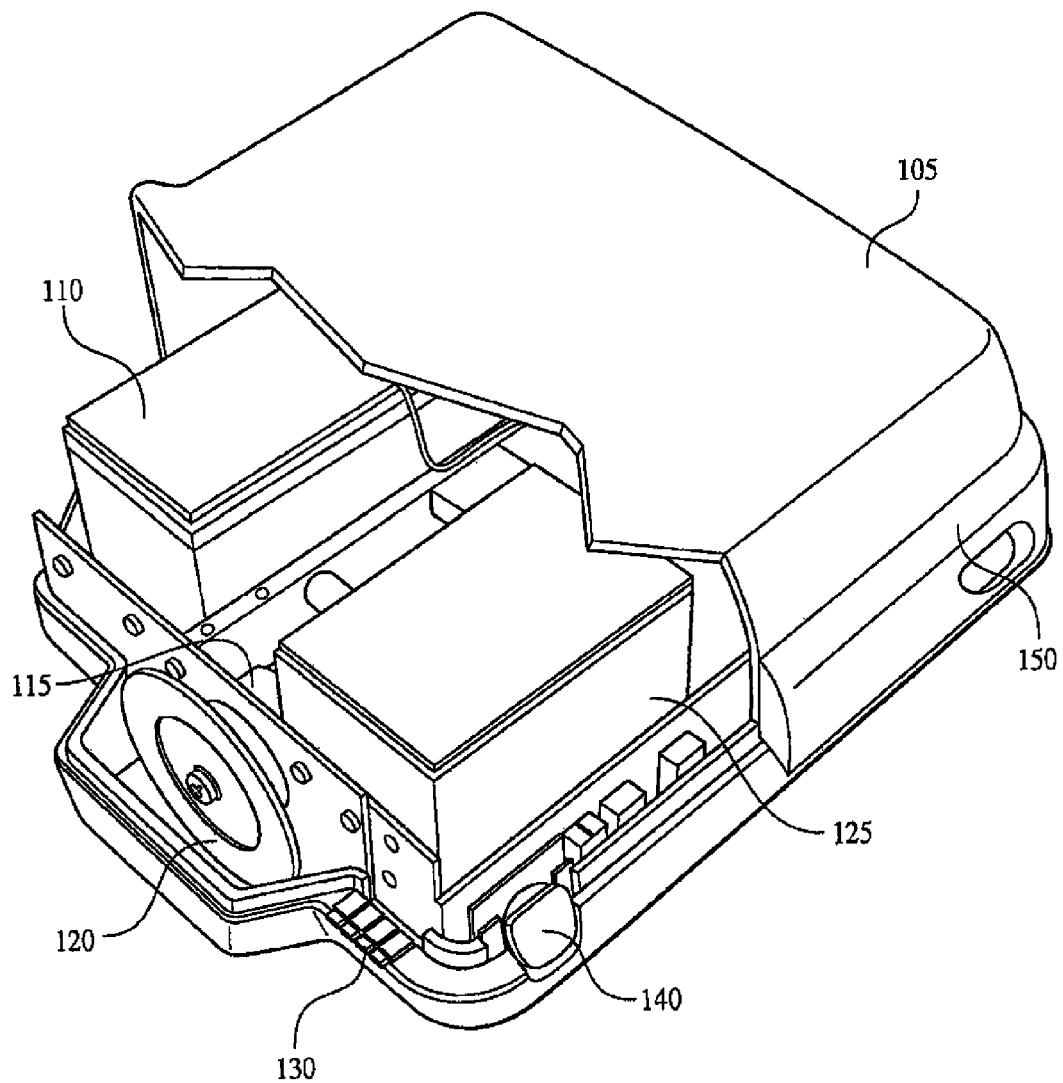
FIG. 2 is an isometric view of an exemplary robotic tug with exposed internal features.
Figure 3:
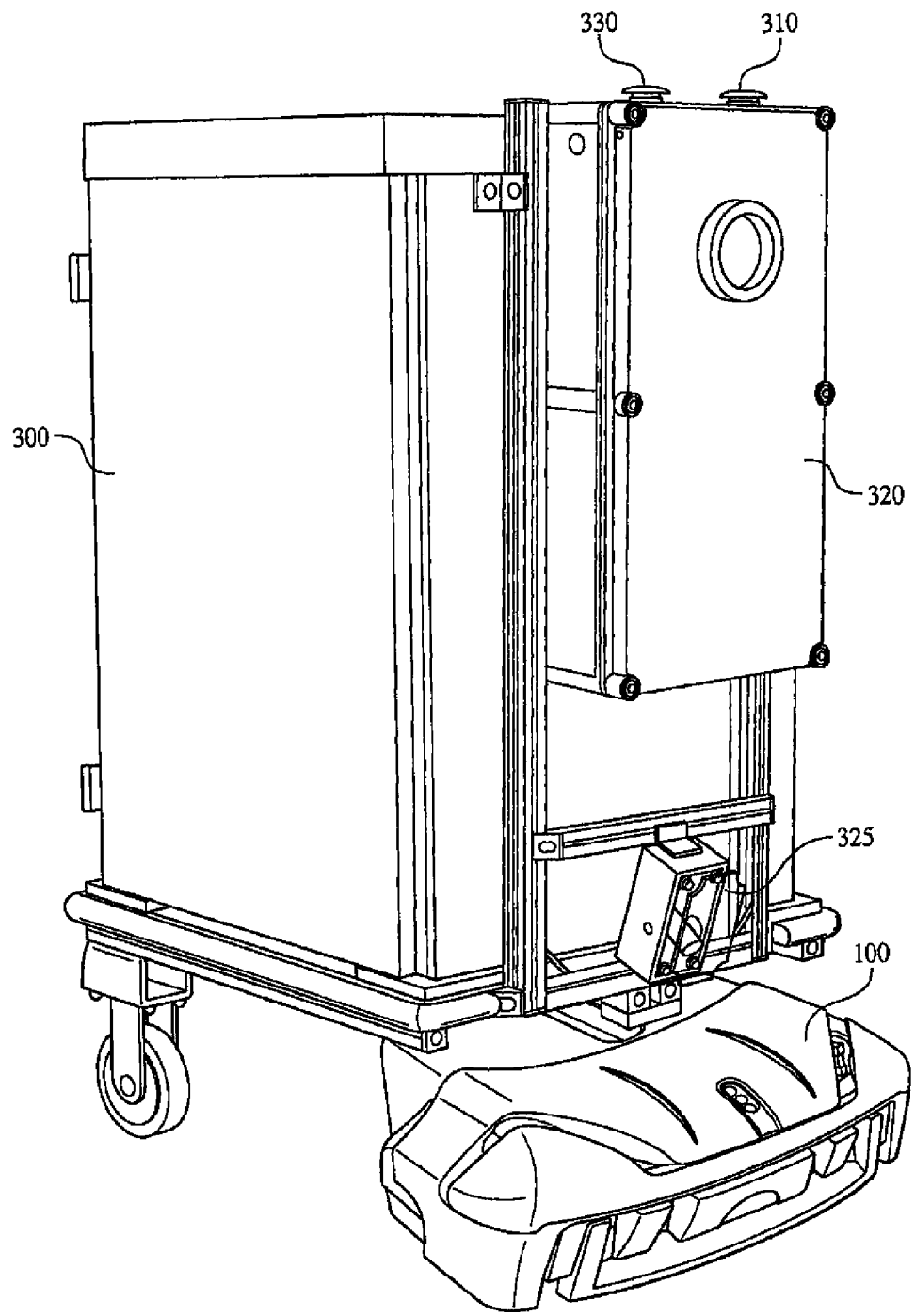
FIG. 3 shows the tug with an attached general purpose cart.

One exemplary embodiment of a robotic tug 100 according to the present invention is shown in FIG. 1 with its cover 105 in place and in FIG. 2 with the cover 105 partially removed to more clearly show internal features of the tug 100. FIG. 3 shows the tug 100 with an attached exemplary cart 300. The pictured exemplary tug 100 is approximately 20" wide and 7¼" in height. A typical tug includes a very low profile enclosure made of high impact, abrasion resistant ABS plastic 105. Moreover, because the tug 100 will often be used in a hospital setting, the surface of the tug may be smooth for ease of disinfection using conventional hospital disinfectants. The tug preferably is capable of hauling up to 500 lbs. (e.g., loaded by the attached cart 300) and up to 250 lbs. across a typical 1" gap across the entrance to an elevator shaft.

The exemplary tug 100 in FIGS. 1-3 has a 24 volt DC power system provided by sealed, lead acid, maintenance-free rechargeable batteries 110. The batteries may be recharged using a charging station (described below) and preferably runs its twin 24 VDC motors 115 and accompanying electronics for 6 hours on a full charge. Each motor 115 is completely independent of the other motor so that precise steering and wheel 120 position sensing can be controlled on a per-wheel basis. With such a configuration and typical cart loads, the tug will operate at a speed of up to 3' per second, which is fully adjustable based on application. Preferably, based on its mapping software, the tug will automatically dock itself into a charging/docking station when not in use or when the battery is low. A full tug charge process takes no more than 4 hours to complete, with quick charges for shorter runs preferably taking only a matter of minutes. Preferably the tugs are programmed to charge for at least 5 minutes between trips in order to make sure that the trip can be completed.

The tug 100 also contains an onboard computer 125 loaded with the tug operating system (TUG OS) software. This software utilizes a detailed map of the hospital along with sophisticated navigation software to plan robotic device routes, avoid obstacles and constantly track its location through the use of a variety of different sensors and other devices—all as described below.

When used in high traffic environments, such as in a hospital, the tug 100 preferably includes warning tones and lights to signal when it is backing up, starting, stopping and entering/leaving an elevator. A cart-mounted speaker may also broadcast selected messages that explain cart functionality, provide additional warnings/announcements or greet/report a user as various tasks are completed (e.g., when an asset is properly delivered to a final location. For example, the device may include pre-recorded or synthesized messages, or audio may be sent via Voice over IP (VoIP) from a remote host to the tug/cart and played through a speaker. In some embodiments, the tug/cart may include a "push to talk" button which automatically connects the device to a remote host via VoIP. The tug/cart may also include a warning light/sound to indicate an obstruction or tampering with the cart in an unexpected manner.

In order to maintain high accuracy when steering the tug 100, a tug preferably includes two (or four) wheels 120 with an aluminum rim encased in a non-skid, high-traction molded urethane tread. A description of the structure and use of such wheels is set forth in U.S. Pat. No. 7,100,725 which has been incorporated by reference above. Preferably, the wheel core is stiff and cannot compress. The thread is made of polyurethane, the same material used in inline skate wheels.

The tug's movement and stopping ability are closely monitored and regulated through a variety of different sensor configurations. For example, a fully-loaded tug preferably stops before contacting objects detected within 18" of its front bumper by means of a grid of forward and/or side-looking infrared sensors 130 that are constantly scanning the environment of the tug 100. Moreover, the tug 100 and/or cart 300 preferably include a red "stop" button 310 which is readily accessible and may be programmed to automatically stop the cart for 5 to 30 seconds, or some other useful time period, as determined by a particular application.

Generally speaking, the main positioning sensor on board the tug is a series of infrared sensors 130—directional light sensors that measure distance along a single line, the length of which is adjustable. A first set of infrared sensors 130 is pointed outward from each side of the tug 100 approximately perpendicular to the movement of the tug. These positional side sensors 130 are used to continuously measure the distance to nearby walls. Such a measurement can be used along with the onboard maps to determine exactly at what location and position/orientation the tug is currently located. Moreover, by recognizing certain features in the environment, such as walls, corners, pillars, etc., as "checkpoints," the robotic device 100 can constantly monitor its location and movement throughout its environment by comparing the position of the tug to a series of consecutive or continuous checkpoints. This algorithm is described in more detail below.

An additional series of infrared sensors is preferably oriented at various vertical angles in front of and around the sides of the tug 100. During the tug's movement, these infrared sensors, the paths of which form a grid or three dimensional "force field" at least in front of the tug, constantly receive sensor data to detect any obstacles that may be in the way of the tug's intended path. When one or more of these directional sensors determines that the path is blocked, the sensors preferably feed this information back to the tug operating system so that an appropriate evasive action may be taken (i.e., stopping, altering path, turning, etc.).

Figure 4:
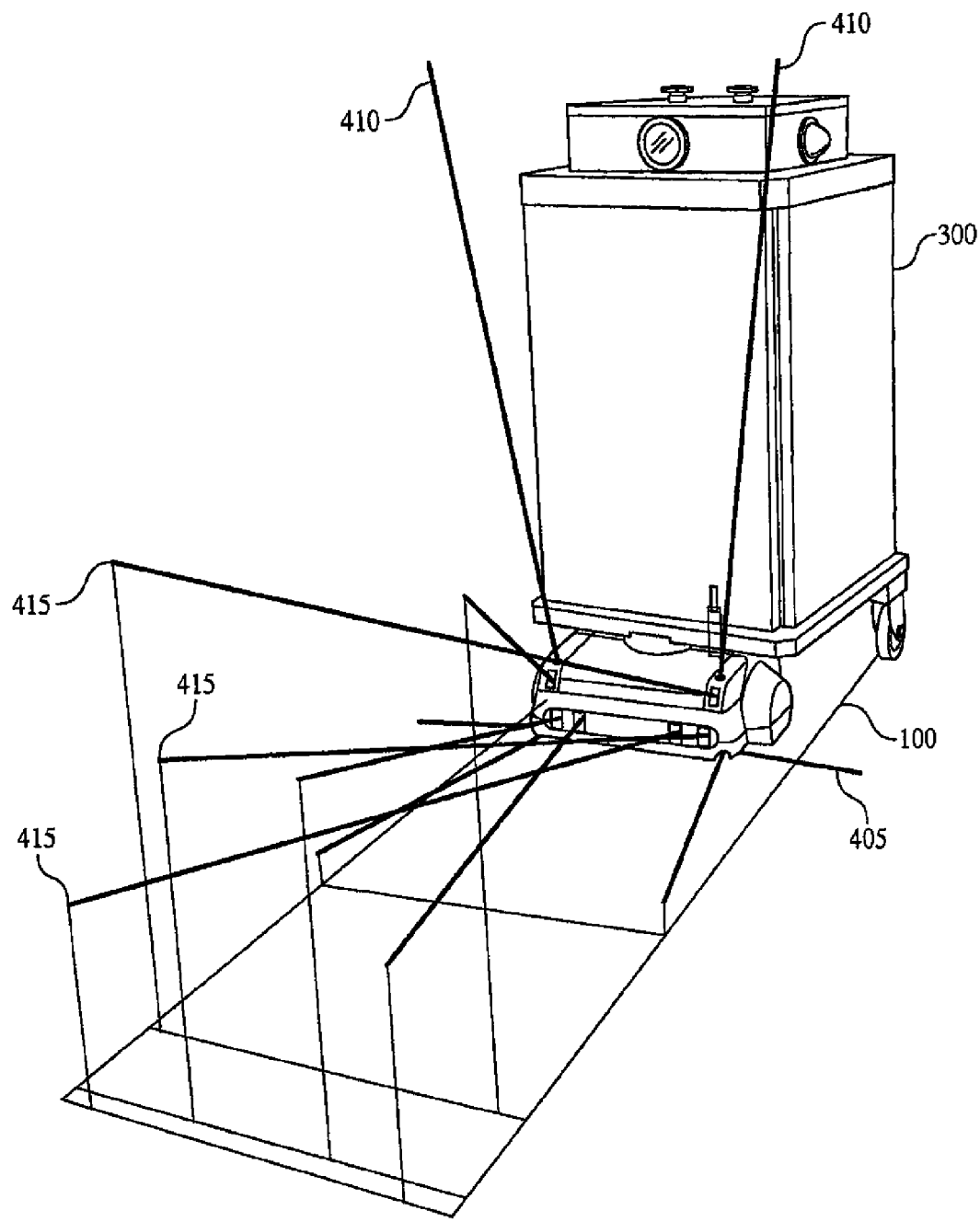
FIG. 4 details one exemplary array of directional light sensors on the front of a tug for detecting obstacles.

FIG. 4 shows one exemplary configuration of the various infrared sensors that may used with the present invention. First, two infrared sensors 405 are pointed approximately 90 degrees from the moving direction of the tug 100 parallel to the floor. These "side" infrared sensors 405 constantly determine distance to the wall (or other identifiable feature) and are chiefly responsible for gathering data used by the tug operating system to correctly orient the tug on its path. Likewise, FIG. 4 also shows two infrared sensors 410 pointing almost vertically out of the top of the tug. These two (or more) vertical sensors 410 are used to identify objects that may hang from the ceiling or protrude from an upper portion of a wall—potential obstacles that may not be picked up by the other forward or side-looking sensors.

FIG. 4 also shows a variety of different rows of forward-looking infrared sensors 415 that constantly measure distances to sense potential obstructions (and/or landmarks) that are generally in front of the tug and cart. Note in FIG. 4 that the infrared sensors 415 are generally grouped in a series of planar rows that are at various different incident angles with respect to the horizon (i.e., parallel to the floor). A first set of sensors 415 may be positioned pointing parallel to the horizon just above the floor line. A second row of infrared sensors may be angled slightly higher than this first row, and a third row may be oriented even higher. Note too that the sensors 415 within each planar row preferably cross each other within their respective sensing plane. This horizontal and/or vertical crisscrossing of the infrared sensors limits the amount of potential obstructions that may be able to fit between the various light beams (and therefore remain as undetectable obstructions).

In certain embodiments, the tug 100 or cart 300 may also include one or more ultrasonic sensors (such as sonar 140) which are oriented generally forward of the robotic device. These ultrasonic sensors provide a very high fidelity picture of potential obstructions in front of the device in exchange for a limited distance field of view. Sonar can also help detect objects that are not easily detectable by the infrared sensors (e.g., shiny objects that reflect light or thin, rounded poles). Depending on the specific application involved, there may also be one or more infrared or other sensors that are positioned in specific manner to detect unique obstacles that may be encountered during a delivery in a specific environment. There may also be one or more rear-facing sensors on the cart that provide for obstacle detection.

Since the tug 100 preferably includes constant monitoring from a local computer system, the tug preferably includes radio frequency (RF) communication capabilities (which may also be used as part of an asset tracking scheme, see below). Moreover, additional functionality may be imported to the robotic device if it can wirelessly interact with certain local devices (e.g., automatic door openers or elevator controllers). The radio frequencies used by the tug are specifically selected so as not to interfere with heart monitors or other equipment that may exist in any particular usage environment. The FCC has strict guidelines that govern the selection and use of the RF spectrum. For example, a bio-telemetry device (e.g., heart monitor) currently must operate between 300 kHz and 30 MHz. Therefore an exemplary tug preferably uses a signal for its elevator door relay operations and for its general wireless LAN communications that is designed to avoid other wireless communications that exist in the area in which the tug/cart is to be operated. The wireless communications are flexibly designed to be adaptable to almost any environment with any existing wireless devices.

The robotic tug 100 may also include a touch bumper 150 or other mechanical "impact" switch that provides an emergency stop in case of impact with an obstruction. Although a cowl or other mechanical device could be used for such a purpose, the touch bumper or "sensing edge" 150 is preferred because it is manually more reliable that alternative switches and is easily adapted to extend around the front and portions of the sides of the robotic device. Moreover, for full 360 degree operation, the tug 100 could be circular in shape with the touch bumper wrapped all the way around the entire perimeter of the tug.

One preferred sensing edge 150 is pressure switch. The pressure switch may be a long, narrow, outer cushioned housing that can be placed behind the bumper of the tug. Upon impact, the sensing edge is activated which causes an emergency stop state to take over. During emergency stop, forward movement of the tug is immediately ceased, and no further movement is permitted for at least a predetermined amount of time. Also, a message is preferably sent to the home base station (described below) which can then be automatically relayed to the remote host for further instructions or corrective measures.

The Tug/Cart Interface

The interface 315 between the robotic tug 100 and the cart 300 is important because of the disparity between the characteristics of the tug and cart. For example, in most applications, the tug 100 will be of a much lower profile and size when compared to the cart 300, and the cart will be of a much larger weight than the tug. Because of this disparity in size, there must be a strong, yet virtually frictionless connector between the tug 100 and the cart 300. Moreover, this connector 315 must maintain a wide amount of rotational freedom (e.g., more than 360 degrees of freedom rotating around a vertical axis) while providing electrical and communicative connectivity between the electronics and power systems onboard the tug 100 and the cart 300 in order to facilitate the tug maneuvering in tight spaces.

A connector 315 that may be used to connect the tug 100 and the cart 300 comes in a variety of different conductor configurations and may be mounted in various horizontal and vertical orientations. For the present embodiment, the connector is mounted in the vertical direction, preferably with the stationary end of the mount connected to the tug (allowing the cart to "follow" the path of the tug). Depending on the location of the power and control circuitry, the conductors may be used to transfer power and signals back and forth between the tug 100 and the cart 300 to accomplish various tasks.

The tug and cart interface 315 may also include some type of sensing that may be used as part of the path planning and adjustment algorithm. For example, an encoder may be placed at the interconnection between the tug 100 and the cart 300 that measures the amount of rotation of the cart pin within the tug's socket. Such a pin rotational sensor would represent the angle between the heading of the tug and the current heading of the cart. As the tug 100 steers along its path and around obstacles, the cart's "steering" will necessarily lag behind the tug's turn. This rotational sensor data can be used by the tug operating system to appropriately account for this lag during path planning.

The tug/cart interface 315 also preferably includes a pressure sensor that is used to determine the weight of the attached cart 300. As the weight of the cart changes, so to do the driving conditions of the tug 100. By taking the weight of the cart 300 (which is ever-changing) into account, the onboard computer 125 can adjust the path planning and movement of the wheels 120 accordingly to follow the intended path. Moreover, if a predefined weight limit is reached, an emergency stop condition could be triggered. Likewise, the intended path could be altered to avoid any inclines or declines if the weight of the cart 300 would cause a dangerous or impossible condition. This same pressure sensor could be used during loading of the cart (see below) to trigger an audible notice to the user that the cart 300 is overweight and should be adjusted.

The Cart and Cart Selection

Preferably there are a wide variety of carts 300 that may be used with a single tug 100. Depending on different intended tasks and different types of retrievals/deliveries that may be made, carts with different characteristics, all that may be attached to the tug through the above connector, may be selected. When selecting a cart 300 for a particular application, the tug/cart combination works most efficiently if the smallest cart capable of performing a particular job is utilized. Some common types of carts for use in the hospital industry are now presented.

Figure 5B:
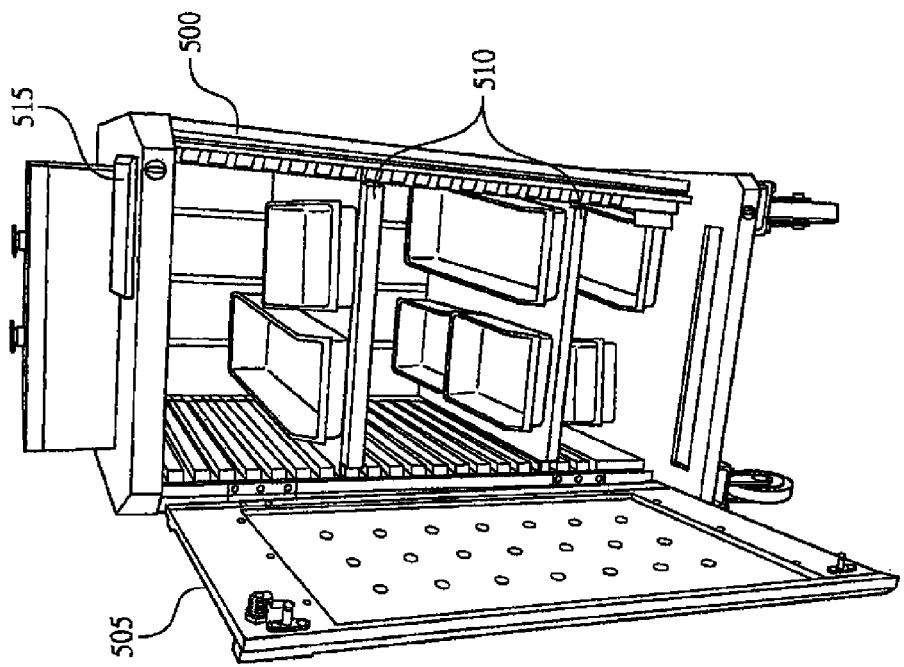
FIG. 5 depicts an exemplary general purpose cart for attachment to a robotic tug device including the cart with the door closed (FIG. 5A) and opened (FIG. 5B)
Figure 5A:
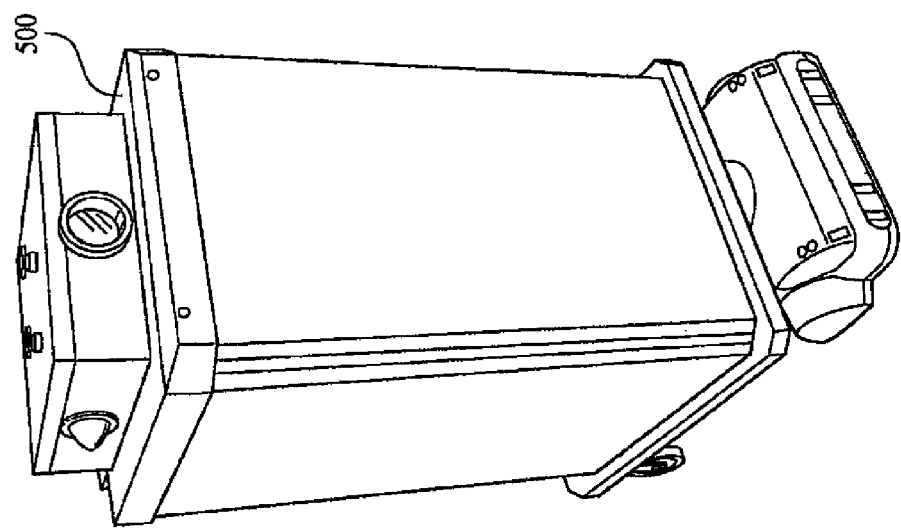

A first cart is the general purpose cart 500 shown in FIG. 5. Specifically, FIG. 5A shows a general purpose cart 500 with the locking door 505 closed, and FIG. 5B shows the same general purpose cart 500 with the door 505 open. The general purpose cart 500 is a traditional cart with adjustable shelving 510 as is commonly utilized in a hospital or other environment. Standard cart dimensions may be approximately 22.8" wide×24.9" deep×40' high. This cart 500 may have a security feature located in the door 505 such as the keypad lock 515 shown in FIG. 5B. Such an electronic locking mechanism 515 limits the accessibility to the contents of the cart 500 to only authorized users. For example, the combination to the lock 515 may only be given out to certain personnel, or the electronic lock may be opened by two or more different password combinations, with the system tracking which authorized user opened the cart at which time(s) by means of data storage means. Such a high security, yet general purpose cart 500 may be useful for delivering lab work, blood to and from a blood bank, confidential patient records and/or Emergency Room (ER) materials that may be highly desirable to thieves.

An alternative cart is a tote cart which may be used to stack, store and deliver a variety of different bulk carriers. The tote cart generally consists of a steel frame of open metal work with a flat, solid base constructed of a size to accommodate a standard bulk carrier. In the hospital setting, a standard plastic "tote" comes in a uniform, stackable size, and a preferred version of the tote cart accommodates 8 of those standard totes, in two columns of 4 totes. Testing of exemplary tote carts yielded a maximum load of approximately 400 lbs. on level ground and 200 lbs. on a 7 degree incline. In and out of a hospital setting, the tote cart is useful for material handling and general distribution of bulk materials.

For hospital and assisted living applications, a third exemplary cart is the dietary cart used to transfer a plurality of meals to various patients, one after another. The dietary cart is similar to the general purpose cart except that the interior portions of the cart are adapted to slidingly accept several different trays (e.g., seven standard 20¼"×15" hospital food trays) stacked vertically. Preferably, because this application deals with sanitary food and medical supplies, the trays are completely removable and the inner portions of the cart may be easily cleaned to prevent contamination. In some embodiments, the entire upper portion of the cart may be designed to "snap" off of its base so that this upper portion can be cleaned and sterilized between uses. Additionally, the door may include some type of locking mechanism like the general purpose cart and/or each of the trays may be secured with a tamper-resistant tie wrap or other security device. Any of these measures prevent stealing and/or tampering with the contents of the dietary cart without overly restricting access thereto.

Figure 6B:
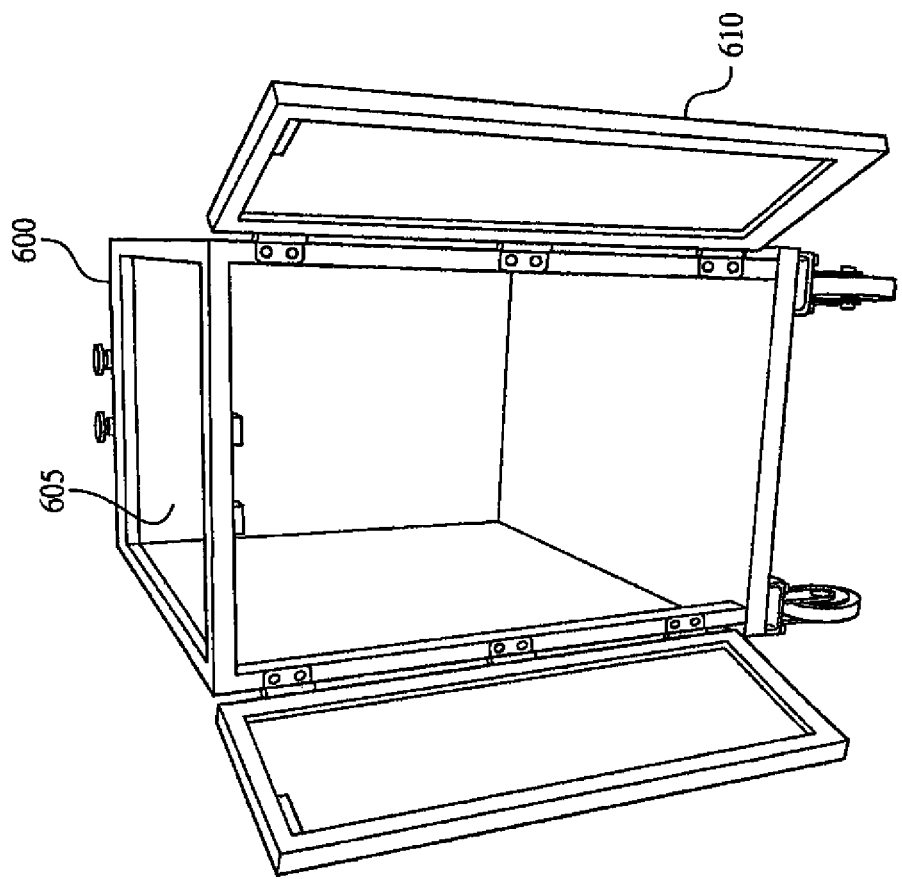
FIG. 6 depicts an exemplary hamper cart for attachment to a robotic tug device with the doors closed (FIG. 6A) and open (FIG. 6B)
Figure 6A:
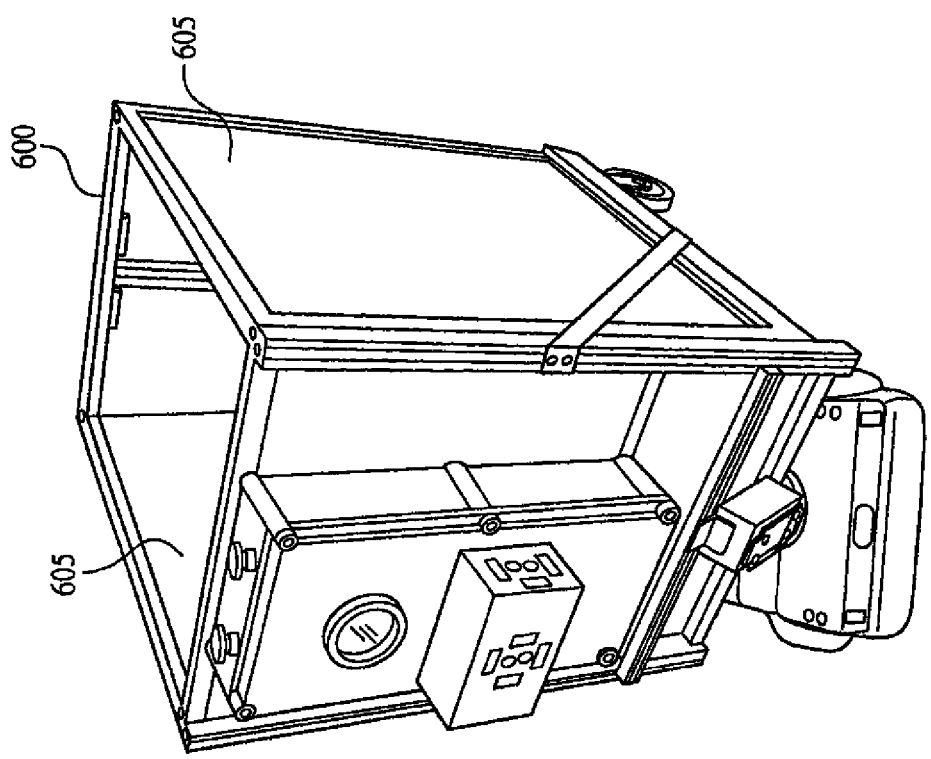

A fourth exemplary cart is the hamper cart 600 which is used to carry linens or other bulk materials in a low profile carrier. As shown in FIG. 6, the hamper cart 600 may have three permanent sides 605 and one side 610 that swings open to allow easy access to all of the linens or other materials inside the hamper cart 600 (shown closed in FIG. 6A and open in FIG. 6B). In order to quickly fill the hamper cart 600, for example when a series of bed linens are being changed, there may not be a top to the hamper cart. Exemplary dimensions for such a cart 600 may be approximately 27" wide×36" high with a weight limit of approximately 100 lbs.

Another exemplary cart is the individual locking drawer cart. This type of cart includes up to 9 or more drawers of varying depths. As an example, drawer sizes may be of standard 3", 6" and/or 9" depths, and each drawer preferably includes its own locking password code or codes. This cart is especially useful in a hospital setting by the pharmacy department. Therefore, it is preferred that the keypad allow up to 500 individual access codes which are all logged by the system in terms of the times and identity of the drawers accessed. There may also be sub-compartments within each drawer that likewise have their own electronic or manual locks which provide selective access to the contents depending on the security clearance of each individual accessing the contents of the cart. This cart is preferably of similar size to the general purpose cart 500 described above.

All of these carts or any other cart configuration may also be designed as an "exchange" cart. The exchange cart allows either automatic or manual removal/replacement of one cart for another in a streamlined manner. This removal/replacement can be accomplished in several different exchange cart orientations. For example, the tug/cart interface could have an automatic or manual coupler/decoupler (similar to railroad cars) that can be used to switch one cart for another.

Alternatively, a specialized exchange cart can be implemented to match with other types of carts. For example, a flat base exchange cart may have releasable latches that allow the attachment/detachment of a variety of different cart bodies (similar to that described with respect to the dietary cart above). Moreover, the exchange cart could be a flat-bed cart that allows any of the other described carts to be rolled up onto the bed and secured in place. In any interaction, the touchstone of an exchange cart is its ability to flexibly provide the use of many different cart styles with a single tug.

With one or more of the above-referenced carts, there may also be an attachment means on a rear face of the cart that is generally referred to as a "pole" option for the cart. In hospital or assisted living applications of the present invention, IV (intravenous) poles are often used to administer liquids in measured continuous doses to patients. These poles typically include a slender vertical rod with three or more hooks to hold bags of fluids all supported by a five-pointed wheeled base. Since these IV poles must also be passed around the hospital, the pole option is a hooked attachment that extends horizontally out the back of a cart (e.g., the general purpose cart) and pulls the IV unit behind the cart. Typically, the option includes a tray extending out from under the back of the cart onto which the IV unit (or other vertical implement) is rolled and suspended, secured by the locking horizontal "hook." In advanced optional embodiments, the cart may even "release" the hook around the IV pole when the delivery is completed. Other alternative hooks may also be added to the various carts, e.g., vertical hooks to hold bed pans that are collected during the tug/cart's deliveries. Also, the attachment means may take the form of a VELCRO fastener or any other commonly available attachment means in place of or in addition to a hook.

TUG Operating System (TUG OS) Mapping and Movement

The TUG OS allows multiple tugs to function efficiently with each other. Since the system tracks the movement of all of the tugs, the operating system can automatically avoid tug bottlenecks and facilitate the coordination of elevator use. Moreover, the TUG OS uses onboard maps to plan robotic device routes and control the movement of the tug and cart. Preferably, both the tug and the cart have a computer, and the functions performed by the TUG OS may be split between these two computers (125, 320).

At the heart of the tug's ability to travel around an environment is detailed knowledge of the terrain in which it is operating. In most building environments, this data comes from CAD (computer aided drafting) drawings of the building (see FIG. 7). The CAD drawings are imported into a graphical interface program which is used to create maps which the tug uses to navigate. Since the tug is based on a modified deduced-reckoning system of motivation, the accuracy of the maps translated into the tug's plan for moving from place to place is important.

As part of the preliminary mapping process, the CAD drawings of the building (e.g., a floor of a hospital) are converted by a software program into a format that the tug can comprehend. For example, the CAD drawing may be converted to a bitmap (.bmp) file that is a perfectly scaled representation of the floor plan of the tug's operating environment. The accuracy of the CAD drawings may be checked with manual surveying at key locations. The key is that the electronic file be scaled such that it represents the actual layout of the tug's environment. In this way, the exact x,y position of the robot in the "real" world is directly translatable to any x,y location on the bitmap. Because of this, the robot can always know its precise location.

Thereafter, these electronic maps (bitmaps) are then used to mark the locations at which the tug is allowed to stop (i.e., destinations), the paths that tug will take to move from place to place, the areas in which automatic doors or elevators exist, the location of home base, the location of annuciators and/or any other desired location. For example, software may be used to electronically "insert" destinations and virtual checkpoints, and an operator can actually draw a path between two checkpoints right on the bitmap of the environment. Since this path is selected and drawn by the operator, it can force the robot to move near one side of a particular hallway, move in curved lines to avoid certain structures, and/or follow what would otherwise be less than optimal paths. Each of these locations and paths is represented in the environmental bitmap and is stored into operating system (TUG OS) running on the tug and/or the cart. In this way, the tug has preprogrammed information on the most efficient way in which to move from one point to another, but it also has additional information that may allow it to take a somewhat alternate route should an obstruction appear.

Figure 7:
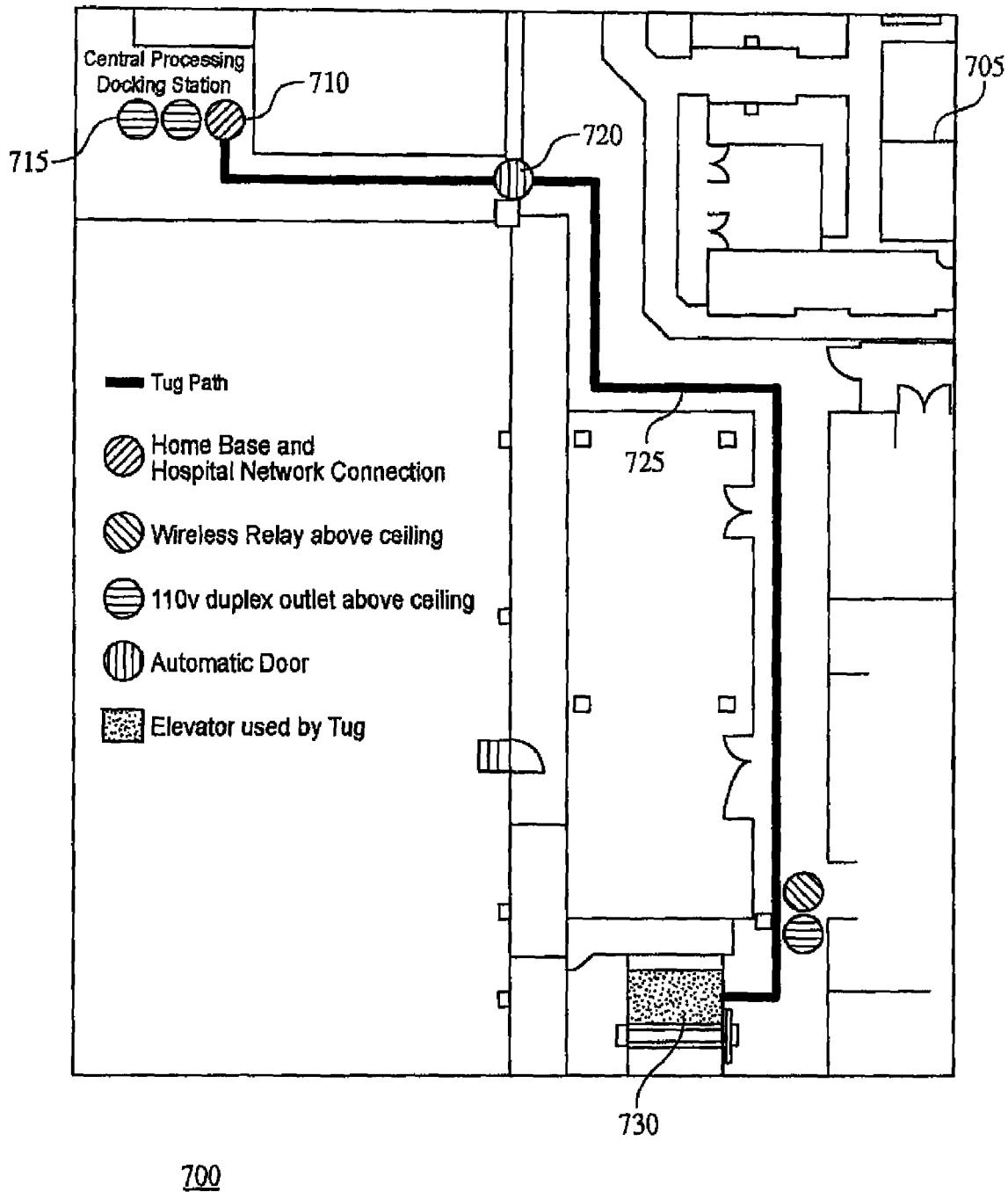
FIG. 7 shows a building CAD floor plan drawing with various system points of interest and a planned tug path depicted thereon.

FIG. 7 shows one example of a bitmap 700 after certain features have been electronically added to the CAD drawing floor plan of an environment. For example, the home base and/or other docking station 710 are shown in the figure. Additionally, the locations of automatic doors 720 and elevators 730 that may be used by the robotic device are depicted overlaid on the existing floor plan (705). Power or communications access points (715) or destination locations may also be shown on the bitmap 700. Finally, the intended paths 725 on which the robotic device will navigate from point to point are also shown. These paths, and all of the associated locations, are shown in the figure at an x,y coordinate that accurately represents its position in real life.

In operation, the robotic device may be directed to make a trip in a variety of ways. For example, a location could be selected directly from the touch screen at the docking station. Alternatively, a nurse or other operator could use a web browser on any computer to send a final destination to a robot. In any case, the final destination is received by the operating system (TUG OS) running on the robot, and this final destination is represented on the stored bitmap. In one preferred embodiment, this TUG OS computer and bitmap are stored in the attached cart. Based on the final destination, the TUG OS software in the cart determines a path to follow in order to arrive at the destination. The TUG OS software then breaks up the path into a series of smaller paths in order to have a list of checkpoints to follow along the path.

The tug's intended path is fed from the cart to the tug in a series of bursts of information that are a list of successive checkpoints or path locations in x,y coordinates. The TUG OS software in the tug compares its current position with the next intended path checkpoint and it determines a velocity to spin each of the wheels in order to direct the tug (and cart) to the next path location. Since each of the two wheels is independently controlled, each of the wheels receives a different velocity command. By adjusting the right wheel motor to a higher speed than the left, a left-hand turn will result, with the amount of the turn related to the speed difference between the two wheels. Encoders on the wheels are used to closely track the rotation of the wheels and the rigid, non-skid wheel surface allows the controller to translate the wheel rotation into the probable position of the tug in relation to the stored map.

As the tug moves through its intended course, it is constantly gathering sensor data from the infrared sensors, sonar and/or any other sensors located on the robotic device. This data may be monitored by the remote host in real time, but it is also used autonomously onboard the robotic tug to determine its current position, orientation and any adjustment to its intended path. The movement along the intended path from the docking station (or other starting position) to any destination is accomplished in the above manner by tracing the paths (in the real world) as they are drawn on the bitmap, while continuously adjusting for path errors and sensed obstacles. Since the onboard map is perfectly scaled to the actual environment, the system is able to compare its real-world x,y position with its intended x,y position on the stored map to constantly update its position with respect to its intended route.

More specifically, when the map conversion is accomplished and the intended routes are matched to the maps loaded within the tug, a series of virtual checkpoints along the route are also mapped. A virtual checkpoint may be any landmark or detectable object/feature within the line of site of any of the sensors onboard the robotic tug or cart. For example, the distance to one or more walls is a one-dimensional way of determining current position (and when combined provides more degrees of positional assurance). Moreover, corners and other wall intersections provide well defined virtual checkpoints along an intended route. As the cart approaches each of the virtual checkpoints, it can then correct its path, e.g., by adjusting the speed of rotation of one of the two independent wheels on the tug) to realign itself with its intended path.

As an alternative, an onboard camera (see 325 in FIG. 3) could be used with a vision system to perform the same obstacle avoidance and position correction tasks as described above with respect to the infrared sensors. The camera may be an additional sensor that is simply used to take pictures of the surrounding area during operation of the robot, or the camera may be used as the primary sensor with which obstacles are detected and/or position is confirmed. Such a camera may be an ordinary visual camera, an infrared camera, a stereovision camera or any other imaging sensor. Typically, both a local user and a remote host can view the video feed from such a camera to gather data about the robotic device's current environment and to address any detected problems.

Multiple wall and corner virtual checkpoints can be used in tandem to provide a high level of accuracy in position and orientation in relation to the stored map of the environment. For example, as the robotic tug traverses down a hallway, it may "plan" to remain 12 inches away from the wall at all times. By continuously monitoring the side sensor distance to the wall, each of these data points can be used as part of a regression analysis to correct the heading until the side sensor reads the correct 12 inch value repeatedly due to a straight heading. Likewise, when corners and other well-defined landmarks are encountered, these virtual checkpoints are used to correct the forward/backward positional error that may have infected the movement algorithm due to the heading correction based upon the wall-based virtual checkpoints.

It is noted here that as an alternative to a single side sensor repeatedly taking data from each side to determine position with respect to the walls and then using a regression analysis to correct for positional errors, a series of perpendicular side sensors could be simultaneously employed along the side of the tug. If data representing the distance to the wall is simultaneously collected from each of these sensors, the difference in the measured distance between these sensors would be immediately translatable to the orientation of the tug with respect to the wall. Appropriate steering correction could then be implemented until each of the sensors reads the same distance. Moreover, as described above, data from a rotational sensor in the interface between the tug and the cart could also be used to aid in steering and path planning.

In much the same way, the sensors (both forward-looking and side sensors) may be used to avoid obstacles that are within the intended path of the robotic cart. For example, as the cart approaches an impediment, the various forward-looking infrared sensors will register the distance to the object and its approximate size (or the size could be presupposed according to an avoidance algorithm upon detection of any obstacle). As the object gets closer, it will begin to take shape in the forward-looking sonar. The tug operating system software can then calculate a path to steer around the object and then to return back to the intended path of the tug and cart. Additionally, as the tug is passing the object, the side sensors can be used to detect the object and if necessary steer the robotic device in order to avoid the object.

In general, there are three distinct types of obstacle avoidance methodologies that may be undertaken by the robot depending on the application. These different methodologies are classified as: (1) coarse; (2) sophisticated; and (3) "sniffer" modes of operation. Each of these three methodologies is described in more detail below.

The coarse obstacle detection methodology is based on predefined assumptions. Whenever one of the onboard sensors (e.g., infrared, laser, sonar, etc.) detects an obstacle within its field of view, the software onboard the tug/cart assumes a predefined "standard" size obstacle at a distance from the robot as determined by the sensor. The planned path for the tug/cart is then re-drawn to maneuver around that hypothetical "standard" obstacle and rejoin the intended path on the other side of the obstacle. Upon executing this re-routing operation, if the sensor again senses an obstacle along this new route, the software assumes another standard size obstacle in its path and redraws yet another new path to get around this second hypothetical object. This methodology is considered "coarse" because it makes standard assumptions about a detected obstacle and so is inherently inefficient in terms of the path traversed.

A second obstacle detection algorithm is considered sophisticated. This sophisticated algorithm uses the sensor data from the onboard infrared, laser, sonar and other sensors to just barely avoid detected obstacles. Specifically, when an obstacle is detected, the size and shape of the obstacle are determined using the sensor data and the obstacle is compared to the stored bitmap. The TUG OS software then redraws a path around the obstacle that avoids the obstacle by only a minor distance. As the robot drives past the obstacle, the obstacle's size and shape are continuously monitored and corrections to the path are made in order to narrowly avoid the obstacle. This sophisticated methodology is more resource-intensive than the coarse methodology, but it is also more accurate in terms of path planning.

A third obstacle avoidance methodology is called "sniffer" mode. Sniffer mode is typically entered by the robotic device's software system when multiple obstacles are detected at the same time, for example in a crowded room or hallway. In sniffer mode, the size and shape of the obstacles are detected by the sensors, and the robot plans a route between and around the multiple obstacles. The robot then reduces its speed in order to collect more sensor data per unit of time. At this slower speed, the robot's path can be constantly updated based on the acquired sensor data to guide the robot through the multiple obstacles. In this way, the "sniffer" mode is similar to a specialized application of the sophisticated path algorithm.

One additional optional feature on the tug is a speed cap that can be used to limit the forward movement of the robotic device without stopping the device altogether. Since false positive readings are periodically going to occur when using directional light sensors such as infrared sensors (because of stray reflections off of reflective material), the speed cap is engaged upon detection of any potential obstruction. However, as the purported object should be getting closer to the robot but has not been re-detected, either by the infrared sensors or the sonar, the previous data can be ignored and the device will be allowed to ramp up to full speed.

Typically, the path planning (map) software assigns speed limits (represented by different colors in the bitmap) to each segment of the robot's path. The speed cap is a way of over-riding the predetermined speed limit when an obstacle is detected. For example, even if the path segment has a speed limit of 3.0 feet/second, the detection of an obstacle at less than 25 feet in front of the robot may place a local speed cap of 2.0 feet/second. Moreover, as the robot moves closer to the obstacle, this speed cap may allow only an even lower top speed. In this way, especially in areas with lots of highly reflective materials, the overall negative effect of false readings will be limited instead of completely stopping the tug upon each (false) detection.

Tug Operation/Home Docking Station

Figure 8:
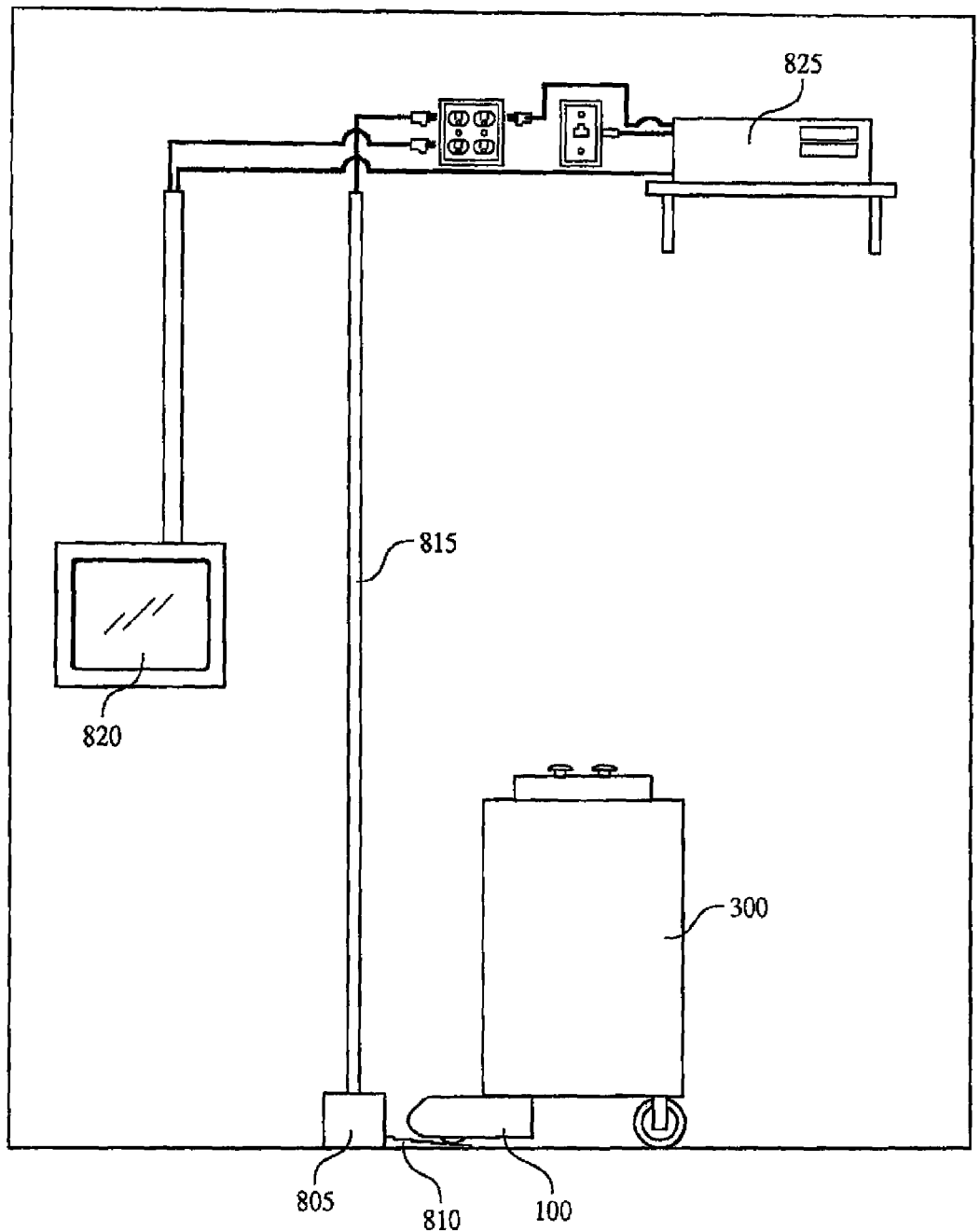
FIG. 8 is a schematic of an exemplary tug home base station.

FIG. 8 includes a schematic of one exemplary home docking station at which the tug/cart docks while recharging and waiting to be sent on a retrieval/delivery run. While recharging, the robotic tug 100 may also perform a self-diagnostic check and send a message locally and/or to the remote host about its current status and usage statistics. The tug 100 may also perform an "environmental" check during which it queries the local computer system (e.g., the hospital system) to ensure that the network is running, the power is functional and the elevators are in good working order. From the docking station, the tug 100 and attached cart 300 may be sent from point to point via a simple "one-touch" send and receive algorithm that is built into the tug operating system. The tug 100 basically rests in a dormant state while connected to a home base docking station. The home base docking station also acts as a communications hub between the hospital computer network and the tug itself (via wireless Ethernet communications).

The home base docking station preferably includes several different devices that work together as the human-tug interaction point. At the lower part of the home base station, there is the tug docking base 805 which provides the physical and electrical connection between the tug/cart and the base station. As seen in FIG. 8, there are preferably conductors 810 onto which the tug 100 rests itself while docking. While in place on the docking base, the batteries within the tug recharge in preparation for future trips. If more than one tug is to be docked near each other in a single mass home base docking area, there is preferably some type of physical barrier between each docking station so that the tug can use its side sensors to properly approach its intended docking base. There may also be a wired communication cable to download certain data from the tug to the home base station that is not otherwise transmitted wirelessly during regular operation. This additional data may be useful for report generation, error checking or just to gather date about the use of the tug.

FIG. 8 also shows a conduit 815 running up the wall from the tug docking base 805 which carries the electrical and/or communication cables to and from the tug 100 while it is docked. The other end of the power conduit is plugged into a traditional 110v outlet to provide power to recharge the batteries.

Above the tug docking base 805, preferably at eye level, there may be a computer monitor 820 with touch screen capabilities or some similar interface for the user to interact and "program" the tug on its journey. The touch screen monitor 820 may provide a variety of different display options or gather various input from the user, but the primary purpose of the touch screen monitor is to provide one touch programming of a delivery route for a tug. When the tug is out on a delivery mission, the touch screen monitor preferably displays the location of the tug on a map of the environment as it travels along its intended route to its destination. In some embodiments, the monitor may also include speakers that announce when a delivery is successfully made by the tug. Additionally, the touch screen may display a status for a tug or display messages sent from the remote host.

In preferred embodiments, the touch screen 820 merely displays web pages that are served from the home base computer 825. The main home base computer/server 825 includes a web server that generates and serves various web pages that represent user screens to all of the user interface touch screens 820 located at each of the tug docking stations. Because the user screens are web-enabled, the user screens may be viewed and manipulated from a variety of different areas. For example, in addition to directly using the touch screen 820 at a docking station (or the main home base docking station) to select one or more final destinations for the robotic device, a user may also make such selections from any web-enabled computer. In this way, for example, nurses within the hospital may select a tug/cart to make a certain run without having to leave their station. Similarly, a user at a remote host may also send a tug to one or more final destinations and/or watch the progress of the tug on the map during a run.

The robotic device may also have a priority queue or scheduler that lists all of the destinations that have been selected for that particular tug in the order that the tug will progress. As the tug arrives at the first destination (perhaps with a delivery of goods), a simple one-touch button (see 330 in FIG. 3) on the robotic device allows a user at that first location to send the tug on its way towards the next "final" destination in its queue. During the tug's trip, however, any user can utilize a web browser and add additional destinations to the list of destinations in the tug's queue or even reorder and re-prioritize the destinations in the tug's queue. This flexibility allows a wide variety of users to utilize a single tug/cart in an efficient manner.

Moreover, this concept of a queue of ordered destinations could be expanded to the use of a robotic device scheduler. For example, because the interface screens are web-enabled, a scheduling program could be used to designate that a certain tug/cart would make a particular run at a particular time in the future (or at the same time each day or every Tuesday). The flexibility and simplicity of the priority queue allow for an almost unlimited variety of scheduling and schedule priority functions.

Figure 9:
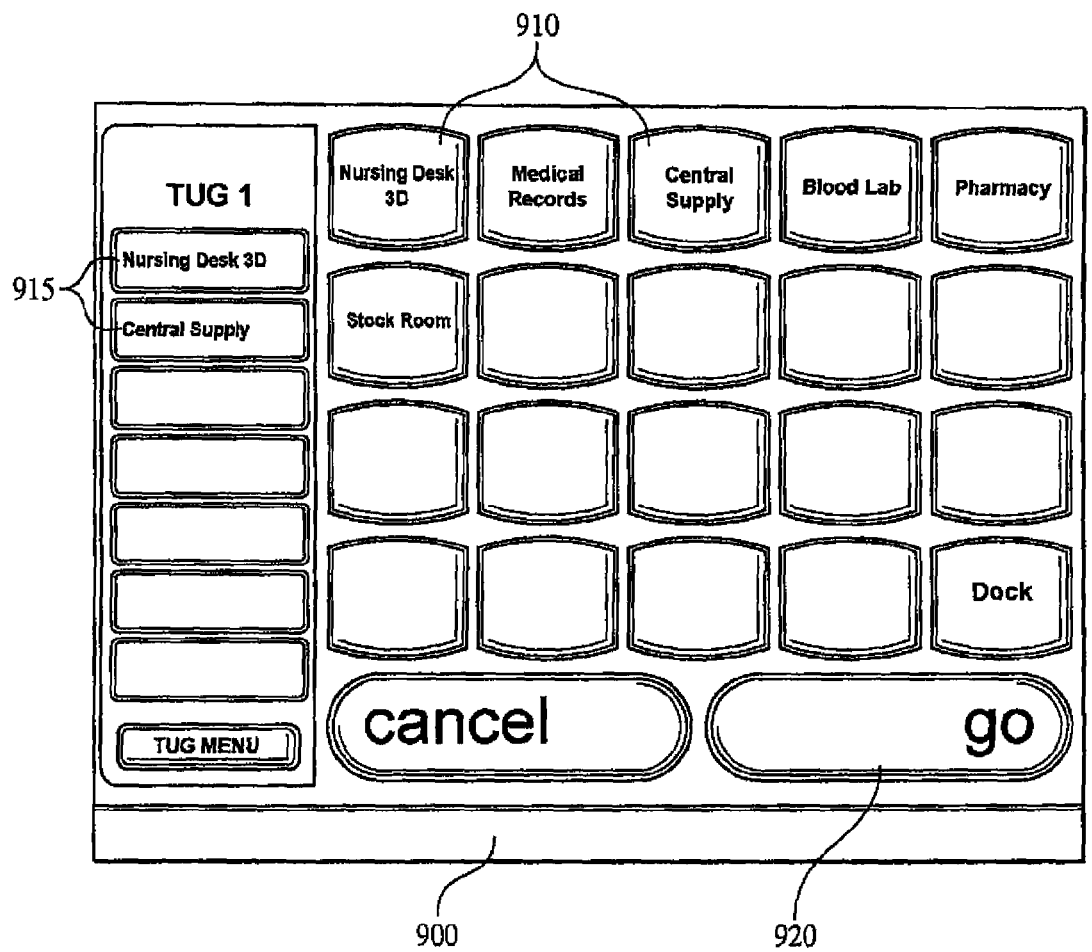
FIG. 9 shows an exploded view of an exemplary user screen on the monitor at the tug home base station.

FIG. 9 shows an exploded view of an exemplary user screen 900 on the monitor at the docking station. As seen in FIG. 9, the user screen 900 may be divided into a grid of locations 910 to which the tug may be sent (e.g., Nursing Desk 3D and Central Supply). As these various destinations are selected, there may be a list 915 of the order in which the robotic device will visit the selected locations (the priority queue) displayed right on the user interface screen. As more locations 910 are selected in the main grid portion of the user interface, they will be added to the queue 915 of locations for the robotic device to visit. To send the robot on its way, the user preferably need only use the touch screen to select the final location (or locations) and press the "go" button 920, and the tug will automatically fulfill the request. The onboard computer software includes a map of the hospital and can find the most appropriate route to the desired end location as described above. As the tug moves along its path, the trip is preferably displayed graphically on the user interface so that the operator has knowledge about the location of the tug/cart at any time. The user interface may also provide status and history screens that provide additional information about the use of the robotic device.

On the receiving end, once the tug and cart reach the intended destination (or next destination), an employee removes the delivered item(s) from the attached cart and presses the green palm button 330 in FIG. 3) on the top of the cart. If the tug/cart has a "next" destination in its queue, it will proceed to that destination. If the queue is empty, the tug then uses its software to determine a path back to its docking station for recharging and to await its next retrieval/delivery run.

Looking back at FIG. 8, if the docking station is the main "home base" docking station which serves as a web server and communications hub for all of the robotic devices, then the docking station will also include a home base computer 825 which performs these system functions. The home base computer 825 preferably includes a wireless network card that is connected directly to the hospital's (or other location's) data network and allows the home base computer to wirelessly communicate with one or more tugs during operation. Through the use of the network, each device on the tug and the hospital network is capable of communicating with each other, virtually in real time. This provides a great deal of flexibility if the tug encounters difficulties. The home base computer 825 and the touch screen 820 are both also powered by a conventional 110V network.

Additional Optional System Components

There are several optional system components that may be used to expand the functionality of the robotic retrieval/delivery system. Many of these optional components address certain commonly encountered obstructions that may otherwise be difficult for an unmanned robotic vehicle to negotiate. Things like closed doors, automatic doors and elevators can all be addressed through various optional aspects of the present invention. The following discussion of "annunciators," automatic door interfaces and elevator control boxes each address one or more of these potential limitations.

A. Annunciator

When a robot is scheduled to make a delivery to (or retrieve an item from) a location that is behind a closed door (e.g., within a patient's room), an "annunciator" can be mounted on a wall or tabletop within the room. As the tug approaches the room, the tug sends a radio frequency (RF) signal to the annunciator which causes the annunciator to make an audible noise and/or to flash lights on the annunciator to indicate to the user that the tug has arrived outside the room.

An annunciator is preferably a small wireless receiver that operates on the 418 MHz spectrum range with limited range (e.g., 50'). Similar to a garage door opener, it is powered by a conventional 110 V source and is activated by the specific signal (which may be encoded if several annunciators are used near each other) from the tug. In addition to a closed door situation, an annunciator could be used for alternative types of alerts as various situations may require.

B. Automatic Door Interface

In many different environments, the use of automatic doors has become commonplace. Many times, the automatic door is used to restrict access to certain locations (through the use of some type of RFID chip to get through the door) or to enable handicapped persons to open a door with a push-button or for some other reason. In any case, automatic doors may prevent certain robotic vehicles from entering certain areas of the environment in which deliveries are desired. The use of an automatic door interface circuit addresses this situation.

The automatic door interface allows a tug to remotely control the switch for an automatic door. This is particularly necessary in situations in which a wall mounted switch must be pushed for access—a task that is not conducive to a small robot. As with the annunciator, a 418 MHz receiver in an automatic door relay is used to receive a message from the tug that it requires opening of the automatic door. The reception of this signal closes a relay that is wired in parallel with the contacts of the door pushbutton. Therefore, as the tug approaches the automatic door, the tug is able to "push" the automatic door button by closing the circuit via wireless communication with the automatic door relay (again, similar to a garage door opener).

C. Notification System

Along with the above-described wireless communications systems, the present system could also incorporate a pager system or other notification system to alert users or administrators that delivery was made or that an error condition has been encountered. For example, if a delivery is repeatedly being made to an area at which a person is often absent, that person could be given a pager which would be called by the tug as it approached the area for delivery. In many embodiments, this notification could take place by the automatic generation and sending of an email or text message (without the use of a conventional paging system). Without visually monitoring the delivery destination, that person could still be available to receive the delivery through the use of the pager. Similarly, any error condition could also trigger a page to a system administrator, either locally or at the remote host, to follow up with corrective measures.

Typically, someone at a help desk at the remote host will monitor these incoming notifications (email or text messages) and can direct a solution to the problem. For example, if a tug sends an electronic notification to the help desk that it is "stuck," the help desk can use its web-enabled software to view a map of the environment in which the tug currently resides and can see the location of the tug relative to its intended path and the environment. The help desk operator can view real-time images captured by a camera onboard the tug and can diagnose certain problems based on the captured images. The help desk operator can also take control of the functionality and operation of the tug via remote control from the help desk at the remote host or service center. Additionally, the help desk operator may trigger one or more predefined messages to be played at the tug (i.e., "please call for maintenance") or the help desk operator may initiate a Voice over IP (VoIP) connection and speak remotely through a speaker attached to the tug/cart. Since most communications and control are web-enabled, the system is very flexible.

D. Elevator Control Box

The tug is also capable of automatically moving from floor-to-floor in a building using the existing elevator systems of the building. This is an important distinction with prior art autonomous robots that are restrained to conventional two-dimensional movement within a single floor. In preferred embodiments, the tug uses an elevator of a hospital using onboard electronics that allow the tug to "take over" the control of the elevator by communicating directly with the building's elevator systems. The tug can call the elevator and select a destination floor using a wireless signal.

Figure 10:
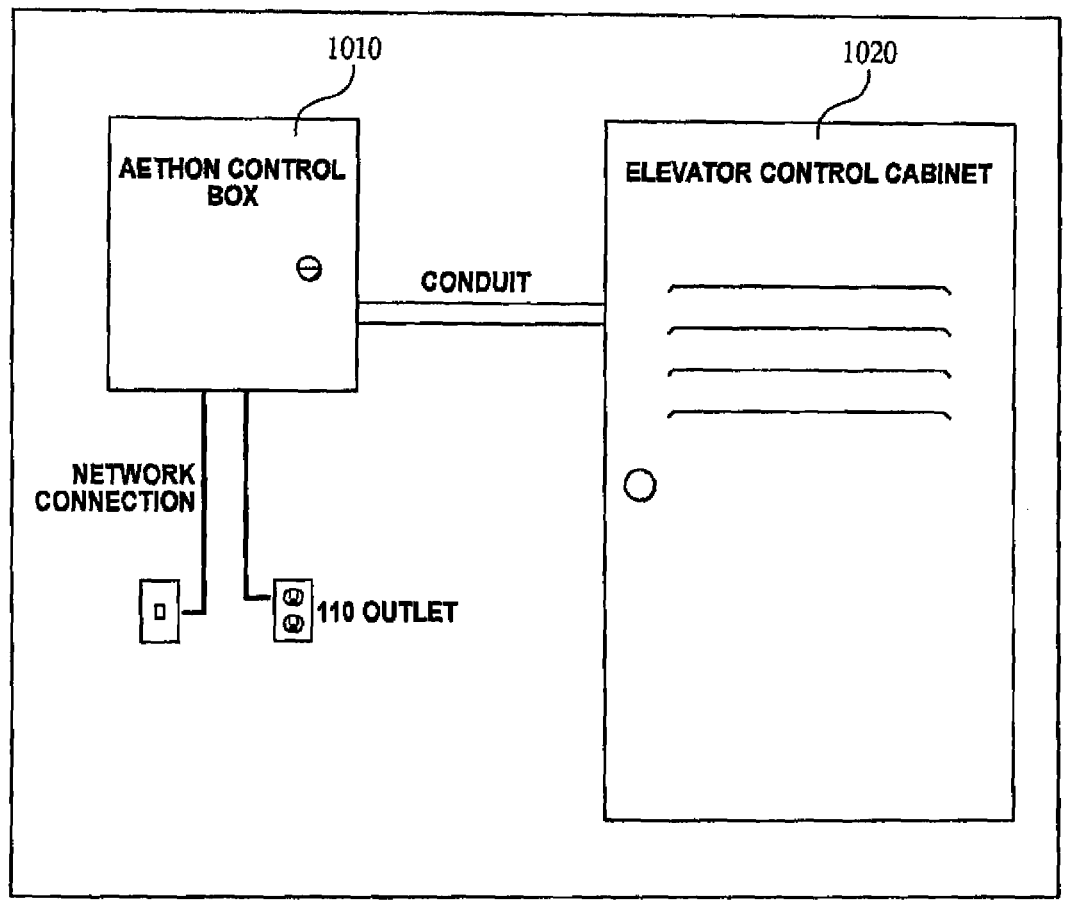
FIG. 10 is a schematic of an elevator interface and existing elevator control box.

More specifically, as seen in FIG. 10, the tug system utilizes an elevator control box 1010 which is wired to the existing elevator control cabinet 1020 that operates the elevators in the building. The elevator control box 1010 has a series of relays which can open and close the circuits in the existing elevator control cabinet 1020 through a conduit connected therebetween. Signals which indicate in what manner the elevator control box 1010 is to control the elevator are received at a network card within the control box which is connected to the wired (or wireless) hospital network (see FIG. 10). Through the use of the wired and wireless communications capabilities of the home base station, the tug can interact with the base station wirelessly and the base station can then interact with the elevator control box (and, hence, the existing elevator control cabinet) through the existing wired or wireless hospital network.

The tug may prefer to utilize a service elevator for convenience, but it can also use a regular passenger elevator in the same way as described herein. Also, in modern elevator systems, there may be a central digital control room into which all of the elevators are wired. Such a central connection point for the elevator controls precludes the need for separate elevator control boxes attached to each elevator and instead provides a convenient digital interface to control all of the elevators on site.

As described above, in order to operate with the elevators, the existing elevator control cabinet 1020 must be adapted to interact with the tug. As a general matter, this interface allows the tug to request that the elevator car arrives on the floor with the tug, and, once inside the elevator, it allows the tug to control the movement of the elevator from floor to floor (without allowing other passengers to utilize the same elevator.

Figure 11:
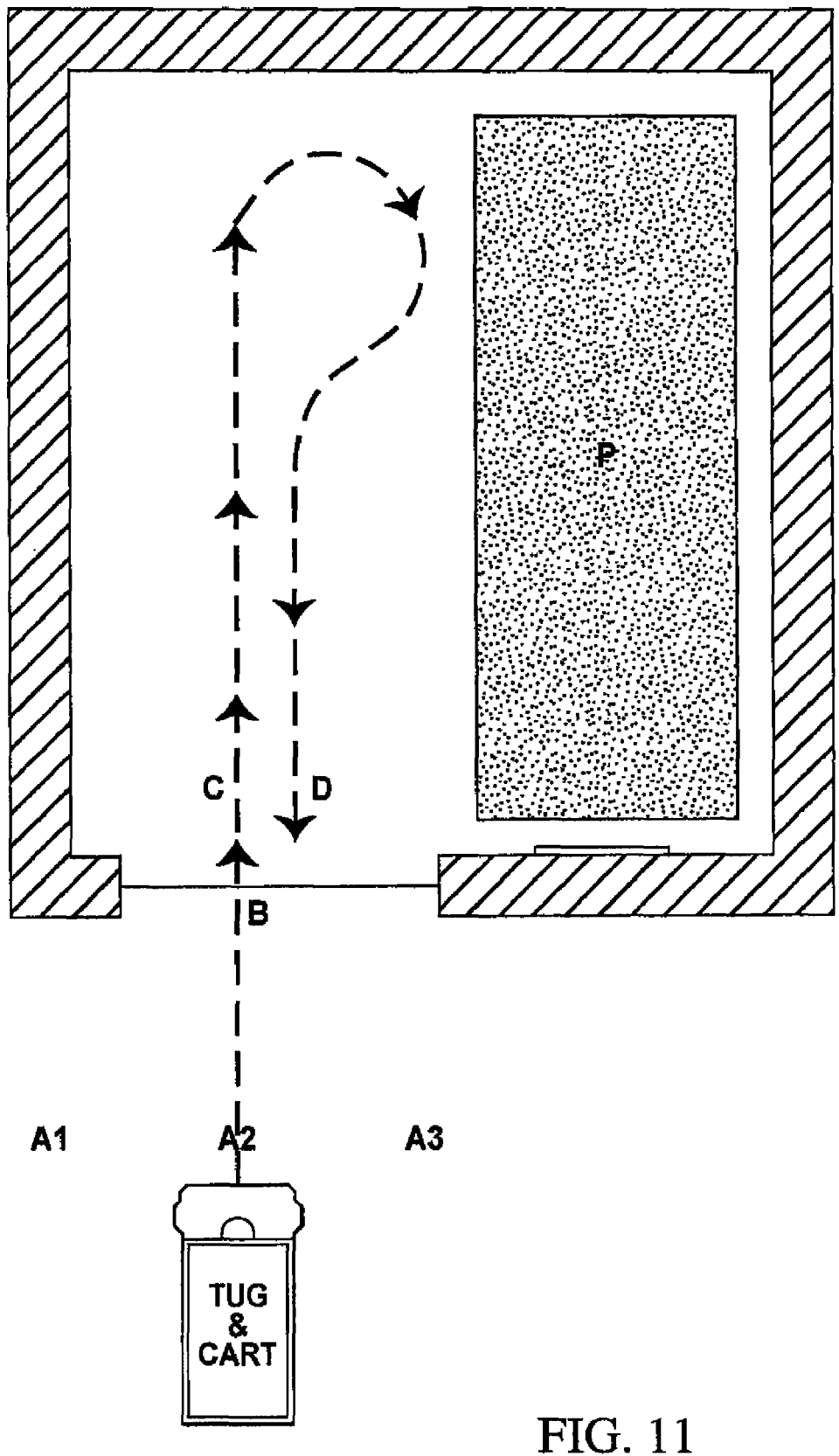
FIG. 11 shows one exemplary embodiment of a map used by the tug and cart to enter, utilize and exit an elevator cabin during a delivery trip.

FIG. 11 shows one exemplary embodiment of a map used by the tug and cart to enter, utilize and exit an elevator cabin during a delivery trip. The tug approaches the elevator and uses its wireless Ethernet adapter to call for the elevator. Preferably, the tug and cart waits at a position similar to position "A1," "A2" or "A3" in FIG. 11 which allows for hospital beds or other large impediments to exit the elevator without being obstructed by the tug.

The next step in the elevator algorithm is to make sure that the elevator cabin is empty. In order to accomplish this task, the tug operating system software removes the elevator cabin from the hall call button loop and waits for the elevator to stop and enter an idle state. In other words, if a person pushed the "call" button from any hallway, the elevator under the control of the tug would not answer that call.

Because the elevator may be full of passengers or equipment at the time that the tug requests the elevator cabin, the next step in the tug elevator process is to answer or complete all of the cabin call requests (requests for various floors made from within the elevator cabin) that have been made. Presumably, the cabin call requests correspond to the floors in which all people within the elevator will get off the elevator, and the elevator should be empty after the last cabin call has been completed.

Once the last cabin call button has been answered, the doors to the elevator will close and the tug software will wait some predefined period of time (e.g., 10 seconds) with the elevator doors closed and will then assume that the cabin is available for tug use. All this time, the tug waiting outside of the elevator preferably plays a "calling elevator" or similar announcement to warn surrounding people what process is underway.

Once the cabin has been emptied, the tug will move from position "A" towards the elevator doors to position "B" (see FIG. 11). Using its onboard sensing equipment, the tug scans for any people or other obstacles which might prevent the tug from approaching the elevator doors. If such an obstacle is detected, the tug will stop and announce that it is "waiting to proceed" or give some other indication of its current state. When successful, the tug will be facing the closed elevator doors at position B.

Once the tug is directly in front of the elevator doors in position B, the tug will call the elevator cabin to its floor and open the appropriate doors (front or rear). As shown in FIG. 11, after the elevator cabin doors open, the tug will move to position "C" just inside the elevator cabin doors. In this way, the tug discourages people, other wheeled carts or other potential impediments from entering the elevator cabin and riding along with the tug. If such a passenger is allowed, the tug may leave some space ("P" in FIG. 11) for these additional passengers.

In one preferred embodiment, once the elevator doors close, the tug preferably moves to a rear corner of the elevator cabin (see dashed arrows in FIG. 11) in order to remain out of the way in case another cart or a person chose to ride the elevator with the tug. At this point, the tug may repeat an audible message informing the other passengers the floor to which the tug is taking the elevator. As the elevator moves to the requested floor, the elevator control box (prompted by the tug through the Ethernet wireless network) will light up or otherwise visually indicate the requested floor and will preferably prevent any other passenger from selecting any additional floors for which the elevator will stop until the tug is able to exit on its requested floor.

In an alternative embodiment, the tug may allow other passengers to ride in the elevator cabin along with the tug (see area "P" in FIG. 11) and to select additional floors for which the elevator is to stop. In this case, the tug preferably moves to its rear position and if additional passengers select other floors, the tug will allow these floors to be selected until all of the cabin calls have been serviced. As before, once all of the cabin calls have been addressed, it is likely that the elevator cabin is empty (except for the tug and cart), and the tug can utilize the elevator control box to bring the elevator cabin to the tug's requested floor. Since the hall call loop has been temporarily disabled throughout the entire elevator procedure, the elevator will not pick up new passengers unless they get on the elevator with the tug or at one of the stops made by cabin call by one of those passengers.

In either case, as the elevator cabin travels to the destination floor, the tug preferably navigates itself through the elevator cabin into position immediately inside the elevator doors facing outward (position "D" in FIG. 11). In this position, the tug discourages potentially oncoming elevator passengers from entering the cabin until the tug has exited. When the cabin reaches the destination floor, the tug utilizes the elevator control box to open the elevator doors and preferably makes a repeated audible announcement that the tug is exiting the elevator and passengers should remain clear. Additionally, as always, the various sensors on the tug are constantly monitoring the tug's environment for potential impediments and will adjust the route and or forward movement of the tug accordingly. Once fully outside the elevator cabin, the tug releases control of the elevator and the hall call loop is again activated, returning the elevator to its normal operating position.

Wireless Tug Communication

The tug requires wireless network access for tug communications at the home base computer, the elevators and elevator lobbies, and areas where multiple tugs may cross each other's paths. To facilitate additional features and communications, it is preferred that wireless computer access be provided throughout the full range of the tug's intended paths. Also to facilitate communication, a static IP address is assigned to each tug, home base computer and elevator computer.

Remote access to the tug home base computer is accomplished with a Virtual Private Network (VPN) tunnel which provides an encrypted and secure way of transmitting data between the hospital and a remote host (i.e., Aethon) via the Internet. This is one reason for providing a static IP address for the home base computer. The remote host may include email communications with the building provider (e.g., the hospital) and it may facilitate an electronic help desk which both monitors the status and movement of all of the tugs and answers user questions related to the operation of the tugs. Data may also be collected at the remote host. For example, the system may send an email message confirming each delivery that is made by each tug. Such data is useful for reporting and trouble-shooting.

Figure 12:
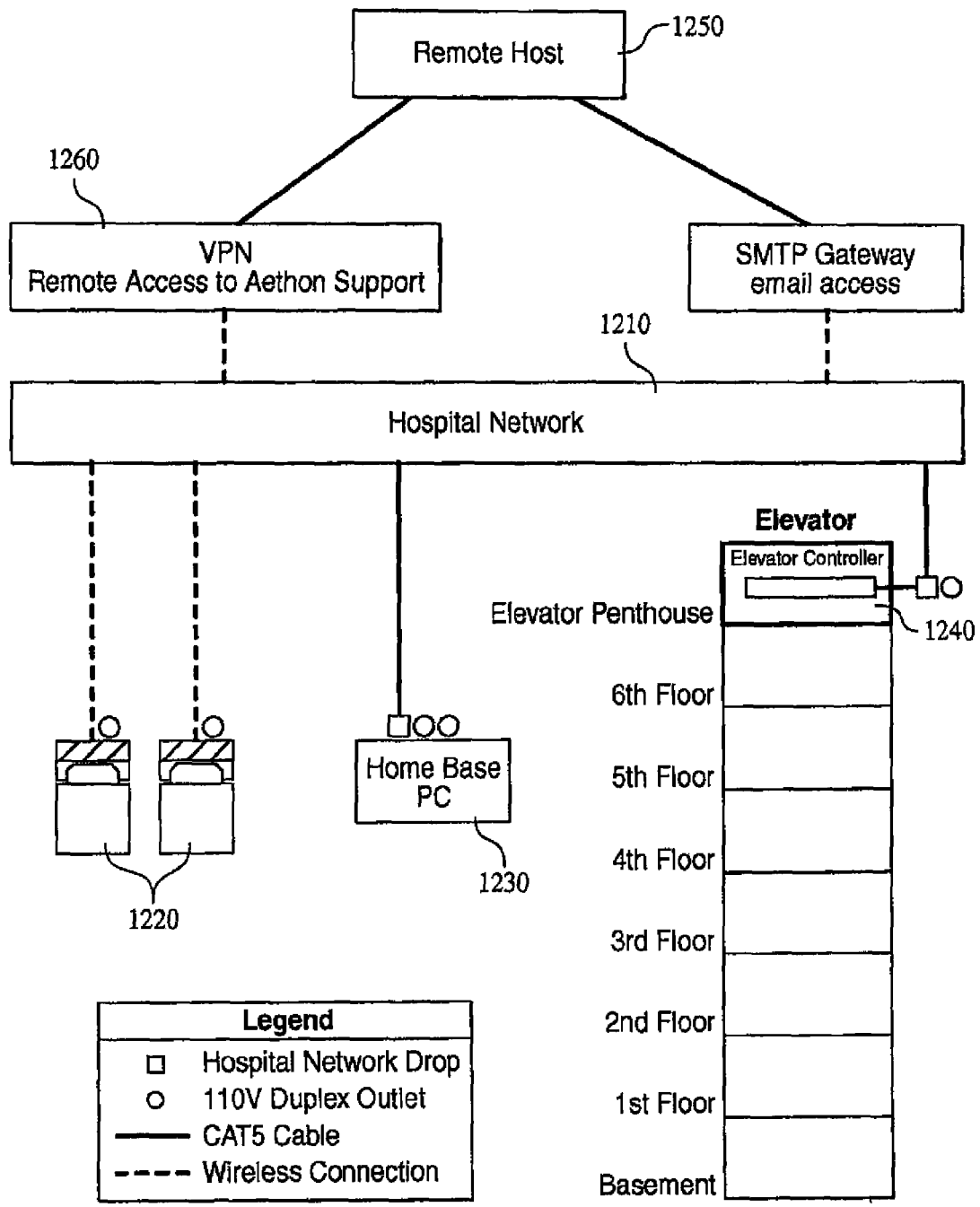
FIG. 12 is a schematic of an exemplary network architecture use with the present invention including a primary data network, a remote host center, and a wireless network utilized by the tug.

FIG. 12 shows one exemplary embodiment of a network diagram for use with the present invention. The main communication point in the center of the network is the existing hospital (or other location) computer network 1210. This is typically a wired or wireless Ethernet network but it may take on a variety of different forms within the scope of the present invention.

Within the same location, below the hospital network 1210 there is shown the system components that exist on site. In FIG. 12, two separate docking bases 1220 for tugs are shown connected to the network along with a home base computer 1230. As described above, these devices are preferably coupled together at one location as part of a home base station which acts as a recharging stand, wireless communications hub and starting point for deliveries. FIG. 12 also shows an elevator controller 1240 which is attached to the hospital network 1210 on one side (for communication with the tug) and the elevator control panel on the other side (to electronically control the elevator when requested by the tug).

Above the hospital network 1210 and connected wirelessly thereto, the system components related to the remote host 1250 are shown. FIG. 12 shows the VPN connection 1260 that preferably takes place over the Internet as well as an SMTP gateway email access for automatic emailing of certain data from the tugs to the remote host 1250 upon certain occurrences (e.g., delivery completion).

Asset Tracking

The tracking of mobile assets with the use of Radio Frequency Identification (RFID) tags is generally facilitated through the use of the present invention. Traditionally, asset tracking is accomplished through the use of fixed antennas that cover the entire environment in which the tags are utilized. According to the present invention, an antenna could be placed directly on the mobile robotic device so that antenna coverage follows the delivery and pickup of materials on the tug itself.

In use, each asset to be tracked is affixed with a passive or active RFID tag. Passive tags are not powered and therefore have a limited range. Active tags are powered and are therefore more expensive but have many times the range of passive tags. For most environments, active tags are the most appropriate choice. All assets that are to be tracked are fitted with a tag, and the tag identifier and its corresponding real world item are logged into an asset management database that may exist onboard the robotic device, at the primary location, at the remote host or in any other location.

Either a normal tug/cart described above or a specially-designed tug preferably roams through the hospital or other local environment searching for tags. In preferred embodiments, a smaller version of the tug is used for asset tracking so that the tug can reach areas that the larger-sized tug and cart could not. As the antenna moves through the environment, it receives an RSSI (Receive Signal Strength Indicator) associated with each detected RFID tag. The robotic device records the locations (x,y coordinates) and RSSI strengths for each RFID tag as they are located. Based on the recorded signal strength data, an approximation of the location of the item identified by the detected RFID tag can be made. This information may be sent wirelessly to the tug base station and then onto the asset management database.

To complete the asset management system, it is preferred that all entrances/exits to the environment (building) be fitted with fixed RFID antennas to determine when a tagged asset has left the building or area. With this information, the tag database can be updated to include currently accurate information. Also, such a detector could be coupled to an alarm or recorded message that alerts a nearby guard or other attendant that a tagged asset is about the leave the hospital. The asset tracking and exit guarding should reduce theft of tagged items.

An Example of the Robotic Device in Use

When a tug with an attached cart are docked in a docking station (e.g., recharging the tug's batteries), a user preferably sends the tug/cart out for a delivery using a very simplified methodology. First, the user loads the cart with the desired good(s) to be delivered. If the cart contains an electronic lock, the user enters the password code into the keypad on the top of the cart, and the cart will automatically unlock. The desired goods to be delivered (e.g., food trays in the dietary cart, or lab work in a general purpose cart) are then placed inside the cart and the door is closed.

Using the touch screen monitor at the home docking station, the user simply depresses the name of the desired location and selects the "GO" button on the bottom of the user screen. In this example, the user has selected an area near two distinct blocks of patient rooms that the user desires the robotic device to visit in order. These two locations are shown on the touch screen monitor in the destination priority queue list. After the "GO" button is pushed, the cart begins its journey and the user interface screen switches to show the tug/cart on a floor plan map.

After the tug arrives at its first destination using the preplanned route along with whatever modifications to the preplanned route must have been made along the way based upon detected obstacles, a similar process takes place in reverse. First, the end user enters an access code on the cart keypad to unlock the door of the cart. Then, the cart door may be opened to gain access to the payload in the interior of the cart. After the good(s) are removed from the cart, the drawers and/or doors to the cart are closed and the "GO" (green) button on the cart is pushed. Pushing this button indicates to the cart that the delivery at that particular location was successful, and the cart will move on to its next delivery according to the tug operating system software. If no one presses the green "GO" button on the cart within a predefined time limit (e.g., 5-10 minutes) then the tug/cart may be programmed to automatically move on to its next delivery in order not to be delayed from its intended schedule. Again, in order to facilitate efficient use of the tug, the tug preferably logs the wait times and locations to be reported back to the administrators of the system for correction or alteration of the tug's plan.

At the next (and final) location, the same process begins again. The user enters a password to access the interior portions of the cart, and the computer within the robotic device stores this access information. After closing the cart door, this new user hits the "go" button and the tug/cart returns to its docking station to recharge and await future trips.

E-Stop

Each cart preferably also includes a red "stop" button that may be used in an emergency. Since the tug/cart does not move at high speeds and further because of the large amount of redundancy in the sensor configurations, it is unlikely that the cart will pose any moving hazard or violently strike any wall or object. However, there may be times, especially in a hospital setting, in which the tug and cart must be moved out of the way abruptly. For these occasions, each cart is preferably equipped with a red "stop" button that, when pressed, pauses the tugs programming for a predefined amount of time (e.g., 30 seconds). During this paused time, the cart may be manually pushed out of the way. When the tug operating system software comes back online, the tug will orient itself to the wall, find its location within the electronic map of the area and continue on with its delivery. This emergency stop time may be recorded for future reporting.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method, comprising:
   at a robotic device,
   receiving a destination for the robotic device from an external source;
   utilizing a map stored onboard the robotic device to determine one or more x,y coordinates positioned on a predetermined path from the robotic device to the destination, wherein the map includes the predetermined path;
   rotating a first drive wheel at a first velocity and a second drive wheel at a second velocity to move the robotic device toward a location corresponding to at least one of the one or more x,y coordinates; and
   changing one or more of the following based on information gathered by one or more onboard sensors:
   at least one of the one or more x, y coordinates;
   the first velocity; and
   the second velocity.

2. The method of claim 1, wherein receiving the destination comprises receiving a final destination.

3. The method of claim 1, wherein receiving the destination comprises receiving an intermediate destination.

4. The method of claim 1, wherein receiving the destination comprises receiving an x,y coordinate from the external source.

5. The method of claim 1, wherein utilizing the map comprises utilizing a scaled map.

6. The method of claim 1, wherein utilizing the map comprises utilizing a bitmap.

7. The method of claim 1, wherein the first velocity is equal to the second velocity.

8. The method of claim 1, wherein the first velocity is different from the second velocity.

9. The method of claim 1, further comprising, at the robotic device, continuously determining a position of the robotic device based on the information gathered by one or more onboard sensors.

10. The method of claim 1, further comprising:
    sending a request from the robotic device to use an elevator; and
    controlling the elevator via the robotic device.

11. The method of claim 10, wherein sending the request comprises sending a request to use a passenger elevator.

12. The method of claim 10, wherein controlling the elevator comprises:
utilizing an elevator control box in communication with the robotic device to:
remove the elevator cabin from a hall call loop;
complete all cabin call requests; and
send the elevator to a floor requested by the robotic device.

13. The method of claim 12, wherein controlling the elevator comprises:
utilizing the elevator control box to control a plurality of elevators.

14. The method of claim 12, further comprising:
after all cabin call requests are completed, sending a message that the elevator is available for use by the robotic device.

15. The method of claim 14, further comprising:
after all cabin call requests are completed, waiting a predefined amount of time before sending the message.

16. The method of claim 10, further comprising:
the robotic device moving into a cabin of the elevator; and
utilizing the elevator to travel from a current floor to a destination floor.

17. The method of claim 16, wherein utilizing the elevator comprises sharing the elevator cabin with at least one other person.

18. The method of claim 16, wherein utilizing the elevator comprises sharing the elevator cabin with at least one other robotic device.

19. The method of claim 16, further comprising completing all cabin call requests before stopping the elevator at the destination floor.

20. A method, comprising:
at a robotic device,
receiving a destination for the robotic device from an external source;
utilizing a map stored onboard the robotic device to determine one or more x,y coordinates positioned on a predetermined path from the robotic device to the destination wherein the map includes the predetermined path;
rotating a first drive wheel at a first velocity and a second drive wheel at a second velocity to move the robotic device toward a location corresponding to at least one of the one or more x,y coordinates;
changing one or more of the following based on information gathered by one or more onboard sensors:
at least one of the one or more x, y coordinates;
the first velocity; and
the second velocity; and
sending a request to use an elevator.

21. The method of claim 20, wherein sending the request comprises sending a request to use a passenger elevator.

22. The method of claim 20, further comprising controlling the elevator via an elevator control box in communication with the robotic device.

23. A robotic device, comprising:
a body;
first and second drive wheels;
one or more sensors; and
a computing device having a processor, wherein the robotic device is configured to:
receive a destination for the robotic device from an external source;
utilize a map stored onboard the robotic device to determine one or more x,y coordinates positioned on a predetermined path from the robotic device to the destination wherein the map includes the predetermined path;
rotate the first drive wheel at a first velocity and the second drive wheel at a second velocity to move the robotic device toward a location corresponding to at least one of the one or more x,y coordinates; and
change one or more of the following based on information gathered by the one or more sensors:
at least one of the one or more x, y coordinates;
the first velocity; and
the second velocity.

24. The robotic device of claim 23, wherein the robotic device is further configured to wirelessly communicate with a remote device.

25. The robotic device of claim 23, wherein the robotic device is further configured to wirelessly communicate with an elevator system.

* * * * *